US008188908B2

(12) United States Patent  (10) Patent No.: US 8,188,908 B2
Landt  (45) Date of Patent: May 29, 2012

(54) SYSTEM AND METHOD FOR MEASUREMENT OF DISTANCE TO A TAG BY A MODULATED BACKSCATTER RFID READER

(75) Inventor: Jeremy A. Landt, Santa Fe, NM (US)

(73) Assignee: Amtech Systems, LLC, Albuquerque, NM (US)

( * ) Notice: Subject to any disclaimer, the term of this patent is extended or adjusted under 35 U.S.C. 154(b) by 7 days.

(21) Appl. No.: 12/840,587

(22) Filed: Jul. 21, 2010

(65) Prior Publication Data

US 2011/0187600 A1   Aug. 4, 2011

Related U.S. Application Data

(60) Provisional application No. 61/299,474, filed on Jan. 29, 2010.

(51) Int. Cl.
*G01S 13/08* (2006.01)
(52) U.S. Cl. ............. 342/51; 342/42; 342/127; 342/128
(58) Field of Classification Search .............. 342/42–51, 342/118, 127–129
See application file for complete search history.

(56) References Cited

U.S. PATENT DOCUMENTS

| | | |
|---|---|---|
| 4,075,632 A | 2/1978 | Baldwin et al. |
| 4,333,078 A | 6/1982 | Henoch et al. |
| 4,358,765 A | 11/1982 | Henoch et al. |
| 4,360,810 A | 11/1982 | Landt |
| 4,728,955 A | 3/1988 | Hane |
| 4,739,328 A | 4/1988 | Koelle et al. |
| 4,804,961 A | 2/1989 | Hane |
| 4,851,851 A | 7/1989 | Hane |
| 4,864,158 A | 9/1989 | Koelle et al. |
| 4,888,591 A | 12/1989 | Landt et al. |
| 5,510,795 A | 4/1996 | Koelle |
| 6,046,683 A | 4/2000 | Pidwerbetsky et al. |
| 6,204,765 B1 | 3/2001 | Brady et al. |
| 6,476,756 B2 | 11/2002 | Landt |
| 6,600,443 B2 | 7/2003 | Landt |
| 6,668,216 B2 | 12/2003 | Mays |
| 6,868,073 B1 * | 3/2005 | Carrender ..................... 370/278 |

(Continued)

OTHER PUBLICATIONS

Alfred R. Koelle and Steven W. Depp, "Doppler Radar with Cooperative Target Measures to Zero Velocity and Senses the Direction of Motion", Proceedings of the IEEE, Mar. 1977, pp. 492-493, vol. 65, No. 3, The Institute of Electrical and Electronics Engineers, Inc., New York, NY, USA.

(Continued)

*Primary Examiner* — Timothy A Brainard
(74) *Attorney, Agent, or Firm* — Caesar, Rivise, Bernstein, Cohen & Pokotilow, Ltd.

(57) ABSTRACT

Distance to a modulated backscatter tag is measured with a RFID reader that measures changes in phase with frequency of modulated backscattered RF signals. Measured distances are linked to a specific tag. The effects of other sources of reflected and interfering signals are mitigated. The techniques eliminate the need for high RF bandwidth used in time-of-flight methods, and may be used with linear, limiting or other types of amplifiers in the reader receiver. Unambiguous distance to a tag may be found using the derivative of phase with RF frequency of the modulated signal backscattered by a tag. The distance to a tag can be measured with an accuracy on the order of a centimeter. The techniques utilize the characteristics of cooperative backscatter tags (transponders, labels, etc.). New readers implement the techniques which may use unmodified tags.

22 Claims, 16 Drawing Sheets

U.S. PATENT DOCUMENTS

| | | | |
|---|---|---|---|
| 7,580,378 B2 | 8/2009 | Carrender et al. | |
| 7,714,773 B2 * | 5/2010 | Ozaki et al. | 342/118 |
| 2002/0046173 A1 | 4/2002 | Kelly | |
| 2003/0233192 A1 * | 12/2003 | Bayh et al. | 701/301 |
| 2009/0121927 A1 * | 5/2009 | Moshfeghi | 342/357.03 |
| 2010/0328073 A1 * | 12/2010 | Nikitin et al. | 340/572.1 |

OTHER PUBLICATIONS

U.S. Appl. No. 60/205,782, filed May 19, 2000 and cited by US Patent No. 6,668,216 and US Patent Application Publication No. 2002/0046173.

* cited by examiner

SYSTEM AND METHOD FOR MEASUREMENT OF DISTANCE TO A TAG BY A MODULATED BACKSCATTER RFID READER

CROSS-REFERENCE TO RELATED APPLICATIONS

This utility application claims the benefit under 35 U.S.C. §119(e) of Provisional Application Ser. No. 61/299,474 filed on Jan. 29, 2010 and entitled System and Method for Measurement of Distance to a Tag by a Modulated Backscatter RFID Reader, the entire disclosure of which is incorporated by reference herein.

BACKGROUND OF THE INVENTION

1. Field of Invention

This invention relates to the field of data communication and, in particular, the field of RFID data communication.

2. Description of Related Art

The technology of locating radio-reflecting objects was developed in the 1940s and refined for many applications for military and commercial use. This technology is known as radar. Airplanes and weather are routinely tracked. Location is determined from a combination of delay (round trip time for the radio wave) and antenna pattern. The doppler shift of the radio wave provides the speed of the object that is being tracked. Pulsed and swept frequency methods have been used for radars as well as pulse compression techniques to improve resolution.

These conventional radar systems are not suitable for tracking a RFID tag in the midst of clutter. The tag is often the smallest radar target in the field of view. Thus, the techniques used for normal pulsed doppler or swept frequency radar systems are incapable of measuring the distance to a tag. Conventional radar systems also require a large bandwidth to achieve sub-meter accuracy. High bandwidth is not allowed in many countries for passive RFID systems.

Some tag-reader systems use a tag that contains an active radio transmitter. It is possible to measure the angle of arrival of the radio wave from the tag at several locations and draw vectors back toward the tag. The tag is located where the vectors intersect. Active transmitter tags are in use for transportation applications, but the cost, complexity, power requirements and size of the tags are barriers that limit their suitability for low-cost tagging applications. It is also possible for the tag to transmit a direct sequence spread spectrum signal that is received by multiple receivers. The received signals can be processed providing the location of the tag in space. (This same principle is used for the Global Positioning Satellite system but with multiple transmitters that transmit signals which are received by terrestrial GPS receivers and processed to provide the receiver's location). Tags using this principle are even more costly and complex than the simple transmitters of the first example. Another approach is for a tag to transmit an ultra wideband signal (UWB) and use readers to measure the angle of arrival of the first signal acquired. Thus, the effects of multipath are minimized. These types of tags contain a source of power for operation such as a battery and require high bandwidth, and thus the technique is not suitable for passive RFID tags. Tags may also measure the strength of signals transmitted by two or more readers and infer its position as being closest to the reader with the strongest signal. While this method may be useful for some applications, a precise location of the tag is not obtained. Two or more readers may measure the strength of signals from a tag and triangulate based on the relative strengths. This method requires reader hardware at two locations which increases complexity and cost, and the method is not accurate since the strength of signals produced by tags vary because of many factors and not only distance.

Backscatter tags modulate and reflect (or retransmit) the radio signal that is received by the tag antenna. The modulated backscattered signal can be distinguished from the unmodulated background signals produced by reflections from other objects in the field of the reader antenna. U.S. Pat. Nos. 4,075,632, 4,360,810 and 4,739,328 are included here by reference and are representative of the technology. All references cited herein are incorporated by reference. The signals produced by these tags can be used to measure the speed and direction of travel of a tag (Koelle, U.S. Pat. No. 5,510,795) in the presence of other reflecting objects. The identification number (or other information stored in the tag) is unambiguously linked to the speed and direction of travel of the tag measured by the reader.

Hane (U.S. Pat. Nos. 4,728,955, 4,804,961 and 4,851,851) has shown how to measure the distance and direction to tags that use a single sideband suppressed carrier modulation using a subcarrier (as described by Henoch, U.S. Pat. Nos. 4,358,765 and 4,333,078). The types of tags using this technique are complex and restricted in use to a limited frequency band. The modulation produced by the systems of Koelle, et. al. use direct modulation of a frequency-shift code on the radio frequency carrier and the methods of Hane are not suitable, nor can be extended to determining direction and distance to the tags of Koelle, et. al. The direction to backscatter tags can be measured using the in phase (I) and quadrature (Q) received signals (U.S. Pat. Nos. 6,476,756 and 6,600, 443). The direction is linked to a specific tag and is obtained in the presence of other reflecting objects. The direction to the tag may be measured at several locations and the location of the tag inferred to be at the intersection of the lines of direction.

All references cited herein are incorporated herein by reference in their entireties.

BRIEF SUMMARY OF THE INVENTION

The purpose of the present invention is to measure the distance between a reader antenna and a backscatter tag, where the tag produces backscattered RF signals with subcarrier modulation using any of a variety of codes such as frequency shift keying, f/2f, FM0, pulse position, pulse width, Manchester, NRZ, amplitude modulation, etc. The radio frequency carrier is typically a relatively narrow band signal in one of the bands such as 915 MHz, 2450 MHz, or 5.8 GHz. These bands are commonly used for RFID systems worldwide. The prior art does not contain a method or apparatus that accomplishes the task of precisely measuring the distance to the tag with accuracy and resolution of 1 to 2 cm within these constraints. The direction to the tag can be measured simultaneously, and thus, the location of the tag can be determined by a reader at a single location.

Another purpose of the present invention is to measure the distance between a reader antenna and an unmodified backscatter tag. In other words, methods of reader construction, reader signal control, and received data processing provide the necessary capabilities without requiring any extra or special modifications of tags. Conventional modulated backscatter tags in present use may be used with the present invention. In the description and explanation of the present invention that follows, no mention is made of modifications or special techniques required for tags. All forms of protocols, modulations, and conformance to standards may be used for the tags. These protocols include but are not limited to ISO 10374, Title 21, ISO 18000-6b, ISO 18000-6c and derivatives as well as other protocols that are not standardized. A reader of the present invention must be able to communicate with a tag so that the distance measurement can be assigned to a particular tag, but no modifications or additions to existing protocols are required. The readers of the present invention can measure the distance to tags within existing populations of tags. One embodiment optionally uses data stored in the tag to aid the new reader in calculating the tag location.

RFID (radio frequency identification) systems use tags placed on objects or places to store information about that object or place. Data stored in the tag is read by a reader when the tag is in the vicinity of the reader. RFID systems have wide application for the automatic collection of tolls on highways, bridges and tunnels; automatic tracking of rail cars; control of access of vehicles and people into controlled areas; automation of manufacturing and distribution of articles; and automating inventory. The primary function of RFID systems is to automatically and economically transfer data to and from objects or places that are physically remote from computer systems. Essential in all of these applications is knowledge about the physical location of the tag with respect to the reader.

A simple, straight forward means to provide location information is to limit the distance over which communication can take place between tags and readers to distances less than the size of the object that is tagged. For example, if the reading zone of a reader is less than the length of a vehicle, and less than the distance between lanes; then when a tag is read, the location of the vehicle can be inferred and the tag can be linked to the particular vehicle that is present in the lane. Subsequently, the correct toll can be collected electronically, and the correct control can be given (raising a gate, giving a green light, avoidance of taking a picture of the license plate on the vehicle for enforcement, etc.).

Control of the reading zone can be accomplished by controlling the power of the signal sent by the reader, the sensitivity of the reader, signal strength of the tag signal, control of the antenna pattern of the reader antenna, and control of placement and orientation of the reader antenna. Other measurements related to the object also aid in assigning a particular tag to an object. For example, light curtains, treadles, loop detectors, infra red sensors, video and other such systems may be used to verify, locate and classify an object in the intended reading zone of the RFID reader. These methods have been found adequate but often problematic to implement for transportation applications (collection of tolls, tracking railcars, gate access, etc.). Microwave transmissions are difficult to control and are fraught with problems such as multipath, reflections, attenuation through materials (windshield glass) and similar phenomenon that affect radio wave propagation. Thus, control of the reading zone is barely adequate for most RFID applications, and totally inadequate if more than one tag is in the field of the reader at a time. More than one tag may be in the field of the reader for most applications involving article tracking (baggage, mail, packages, parcels, goods on a conveyor), free-flow traffic, etc. Thus, precise determination of the location of a tag is required.

In an embodiment of the invention there is disclosed a system for measuring the distance between a first and second radio. The system includes: a first radio having a first radio transmitter and a phase sensitive receiver and a second radio. The first radio transmitter transmits first and second signals at first and second frequencies and the second radio modulates the first and second signals to create modulated backscattered first and second signals having first and second phase relationships to the first and second signals. The phase sensitive receiver produces first and second outputs representative of the first and second phase relationships and the distance between the first and second radio is calculated as a function of the first and second outputs.

In a further embodiment, the phase sensitive receiver comprises an in phase mixer (I) and a quadrature mixer (Q) and produces the outputs representative of the first and second phase relationships. In a further embodiment, the distance between the first and second radio is calculated as a function of the first and second outputs and signal strength. In a further embodiment, the first and second signals are transmitted at different times.

In a further embodiment, the first radio includes; a first and second transmitter and first and second phase sensitive receivers and wherein the first transmitter transmits the first radio signal, the second transmitter transmits the second radio signal, the first phase sensitive receiver produces the output representative of the phase relationship between the first radio signal and the first backscattered signal and the second phase sensitive receiver produces the output representative of the phase relationship between the second radio signal and the second backscattered signal. In a further embodiment, each of the phase sensitive receivers comprises an in phase mixer (I) and a quadrature mixer (Q) to produce outputs representative of the first and second phase relationships. In a further embodiment, the first and second signals are transmitted simultaneously and the second radio modulates and backscatters both signals simultaneously.

In a further embodiment, the distance between the radios is calculated as a function of the difference between the first and second outputs.

In a further embodiment, the first radio transmitter comprises limiting amplifiers on the outputs of the I and Q mixers and a variable phase shifter for shifting the phase of the first and second transmitted signals relative to a reference signal used by the phase sensitive receiver. In a further embodiment to this one, the variable phase shifter is adjusted to produce a quadrature null. In a further embodiment, the distance between the radios is calculated as a function of the rate of change of the difference between the first and second outputs with respect to frequency. In a further embodiment, the first radio transmitter transmits signals at more than two frequencies and produces outputs representative of phase relationships for each of said frequencies and the distance between the radios is calculated as a function of the rate of change of the difference between the outputs with respect to frequency. In a further embodiment, the frequencies are swept.

A further embodiment includes a logic circuit to combine the I and Q outputs to determine a polarity relationship between the I and Q outputs.

In a further embodiment, the modulation by the second radio includes a synchronization marker to resolve phase angle ambiguity.

In a further embodiment, the first and second radio transmitters each have a variable phase shifter for shifting the phase of the first and second transmitted signals relative to a reference signal used by the first and second phase sensitive receivers, respectively. In a further embodiment of this system each of the variable phase shifters is adjusted to produce a quadrature null. In a further embodiment, the distance between the radios is calculated as a function of the rate of change of the difference between the first and second outputs with respect to frequency. In a further embodiment, the first radio transmitter transmits signals at more than two frequencies and produces outputs representative of phase relationships for each of the frequencies and the distance between the radios is calculated as a function of the rate of change of the difference between the outputs with respect to frequency. In a further embodiment, the frequencies are swept.

In a still further embodiment of the invention, there is disclosed a system for measuring the distance between a first and second radio. The system includes a first radio having first and second RF signal generators; a radio receiver having first and second in phase (I) and quadrature (Q) mixers, a signal combiner; and a second radio. The first and second RF signal generators transmit simultaneous first and second signals at first and second frequencies through the signal combiner. The second radio modulates the first and second signals to create backscattered first and second signals having first and second phase relationships to the first and second signals. The first I/Q mixer produces a first output representative of the first phase relationship. The second I/Q mixer produces a second output representative of the second phase relationship. The distance between the first and second radio is calculated as a function of the first and second outputs.

In a still further embodiment of the invention, there is disclosed system for measuring the distance between a first and second radio, the system includes a first radio having an RF signal generator; a radio receiver comprising an in phase (I) and quadrature (Q) mixer with limiting amplifiers on the outputs of the mixers; a variable phase shifter for shifting the output of the RF signal generator relative to a reference signal used by the I/Q mixer; and a second radio. The RF signal generator transmit first and second signals at first and second frequencies. The second radio modulates the first and second signals to create modulated backscattered first and second signals having first and second phase relationships to the first and second signals. The variable phase shifter is adjusted to produce a quadrature null at the I/Q mixer for each of the first and second signals. The amount of adjustment of the phase shifter necessary to achieve the quadrature null is representative of the first and second phase relationships, and the distance between the first and second radio is calculated as a function of the first and second phase relationships.

In a still further embodiment of the invention, there is disclosed a system for measuring the distance between a first and second radio. The system includes a first radio having: an RF signal generator; a radio receiver having an in phase (I) and quadrature (Q) mixers having I and Q outputs; and an XNOR logic element to combine the I and Q outputs to produce an S signal representative of the polarity of the I and Q outputs; and a second radio. The RF signal generator transmits a swept frequency signal. The second radio modulates the swept frequency signal to create a modulated backscattered swept frequency signal, and the RF frequencies corresponding to transitions in the S signal are recorded and used to calculate the distance between the first and second radios.

In a still further embodiment of the invention, there is disclosed a system for measuring the distance between a first and second radio, the system includes: a first radio having: an RF signal generator; a radio receiver having an in phase (I) and quadrature (Q) mixers having I and Q outputs; a variable phase shifter for varying the phase of the reference signal for the in phase (I) and quadrature (Q) mixers; and an XNOR logic element to combine the I and Q outputs to produce an S signal representative of the polarity of the I and Q outputs; and a second radio. The RF signal generator transmits first and second signals at first and second frequencies. The second radio modulates the first and second signals to create modulated backscattered first and second signals having first and second phase relationships to the first and second signals. The RF frequencies corresponding to transitions of the S signal at the the first and second frequencies are recorded and used to calculate the distance between the first and second radios.

In a still further embodiment of the invention, there is disclosed a system for measuring the distance between a first and second radio, the system includes: a first radio having: first and second RF signal generators; a radio receiver having first and second in phase (I) and quadrature (Q) mixers having I and Q outputs; a first and second XNOR logic elements to combine the first and second I and Q outputs to produce first and second S signals representative of the polarities of the first and second I and Q outputs; and a second radio in motion with respect to the first radio. The first and second RF signal generators transmit simultaneous first and second signals at first and second frequencies. The second radio modulates the first and second signals to create backscattered first and second signals having first and second phase relationships to the first and second signals. The first I/Q mixer and XNOR logic circuit produce first outputs representative of the first phase relationships. The second I/Q mixer and XNOR logic circuit produce second outputs representative of the second phase relationship; and the distance between the first and second radio is calculated as a function of the first and second outputs.

In a still further embodiment of the invention, there is disclosed a method for measuring the distance between a first and second radio. The method includes the steps of: transmitting by the first radio first signals at a plurality of frequencies; modulating the first signals by the second radio to create a plurality of backscattered signals having a plurality of phase relationships to the first signals; receiving at the first radio the backscattered signals; producing phase relationship signals at the first radio that are representative of the phase relationships; and calculating the distance between the first and second radio as a function of the phase relationship signals.

DETAILED DESCRIPTION OF PREFERRED EMBODIMENTS OF THE INVENTION

Those skilled in the art will recognize other detailed designs and methods that can be developed employing the teachings of the present invention. The examples provided here are illustrative and do not limit the scope of the invention, which is defined by the attached claims. For example, disclosure with respect to waveforms for encoding or representing data can apply equally well to the inverses of the waveforms used as examples.

Physical Principles

Figure 1:
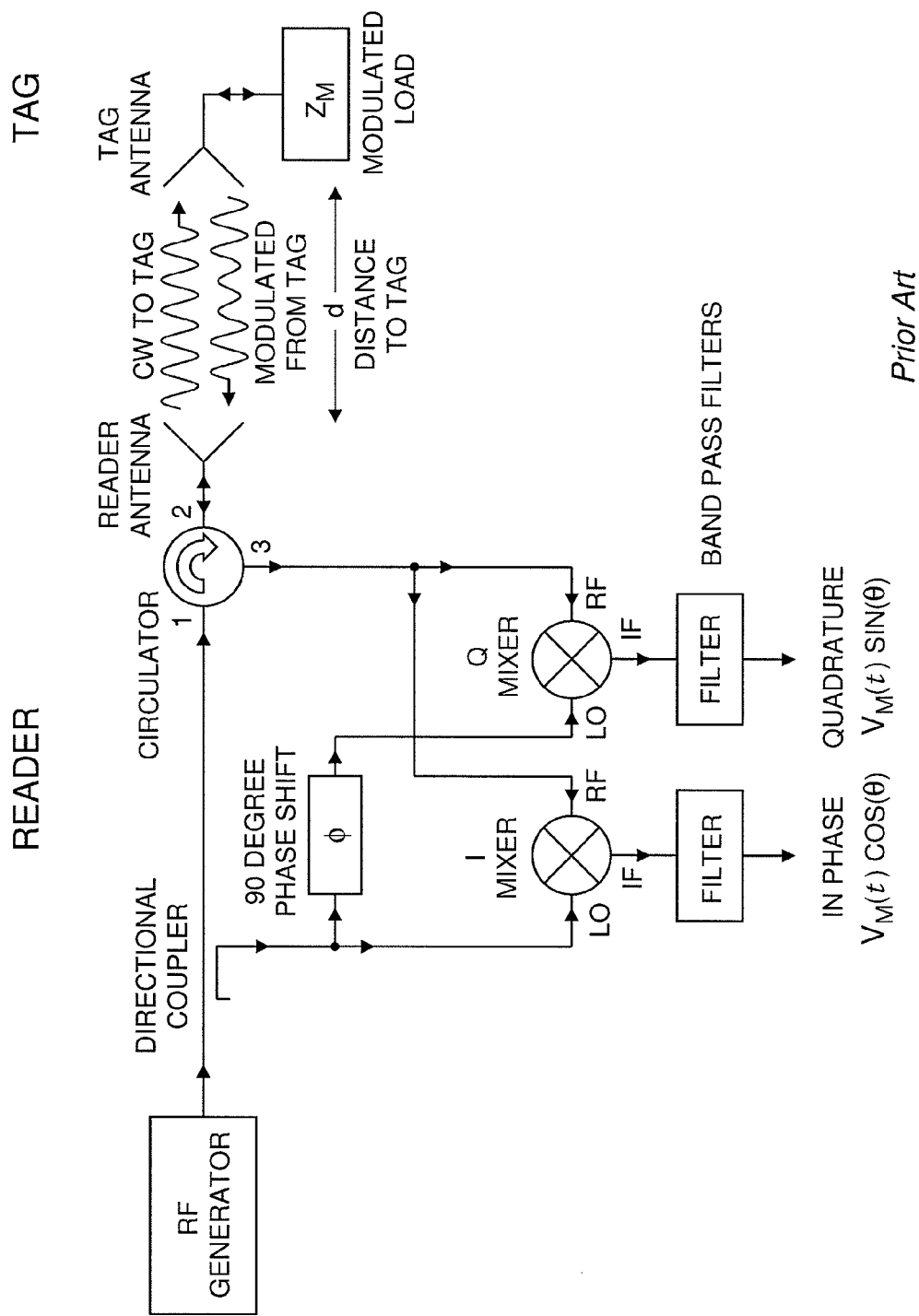
FIG. 1. Is a schematic diagram of a Backscatter RFID reader with quadrature homodyne receiver.

A modulated backscatter RFID reader of the Prior Art is shown in FIG. 1. A reader in a RFID system may send commands and data to a tag using modulated RF signals, and may read data from a tag using modulated backscatter by sending CW signals to the tag.

Data is transferred from the tag to the reader in a process called reading. To read a tag, the tag is placed in a mode to be read, either automatically, by command at the tag or by command sent from the reader. The reader RF generator then produces an unmodulated continuous wave (CW) signal that is transmitted to a tag by a reader antenna and modulated by the tag. The periods of CW reader signal may optionally be interspersed by periods of modulation by the reader to alternate reading information from the tag and sending information to the tag. Various components may be along the path between the RF generator and the reader antenna.

The tag modulates the CW RF signal received from the reader and sends it back to the reader. This may be accomplished by modulating the impedance of a load on the tag antenna. The modulated load impedance results in a modulated backscatter signal from the tag. Thus, the tag antenna both receives the RF signal from the reader and reflects the modulated signal back to the reader. The impedance is changed in time in a coded fashion depending on the data that that is intended to be sent from the tag to the reader. Other methods may be used. For example, the tag can receive the CW signal from the reader, modulate the signal using circuitry in the tag, and then transmit the modulated signal to the reader. This can be done either with a single tag antenna, or two tag antennas. Amplitude modulation, phase modulation, or a combination of the two can be used by the tag. Typically, the tag modulates a subcarrier using frequency shift keying (FSK), FM0, pulse width, pulse position, Manchester, or the like. All methods result in the frequency of the RF carrier signal sent or reflected by the tag to be precisely the same as the frequency of the RF carrier signal received by the tag.

Signals received by the reader antenna are be separated from the signal transmitted by the reader antenna using a circulator. A circulator is a three-port RF component that delivers a signal entering at one port to exit at the next port. The signal from the RF generator enters the circulator at Port 1 and exits at Port 2 and is sent to the reader antenna and radiated. RF signals arriving at the reader antenna are received and are sent to Port 2 of the circulator which outputs the signals at Port 3. Thus, the RF signal from the RF generator is directed to the reader antenna and radiated, and the modulated signal from the tag and other RF signals received by the reader antenna are directed to Port 3 and sent to the reader mixers. These signals are occurring simultaneously.

The signals received by the reader antenna enter the RF ports of mixers to be mixed with a reference signal present at the LO (local oscillator) ports of the mixers, producing output signals at the IF (intermediate frequency) ports. The LO signal can be obtained from a portion of the signal sent to the tag from the RF generator using a directional coupler as shown in FIG. 1. A mixer produces output signals at the IF port that result from multiplication of the input signals at the RF port with the input signal at the LO port. Output of the IF port contains signals containing sum and difference frequencies and sidebands of the signals input to the LO and RF ports. The difference frequency components are the demodulation or conversion of the modulation on the RF signals to baseband. Sum frequency signals, unmodulated base band signals and other unwanted interference signals are removed by filtering.

Since the RF frequencies of the LO and RF carrier signals are precisely the same (thus a homodyne receiver), the output signal at the IF port of a mixer are signals containing the low frequency (subcarrier) modulation from a tag and signals at twice the RF frequency. The IF signal also contains signals due to reflections from stationary and moving objects in the field of the reader antenna, other spurious signals arising from components in the reader and tag, and from other RF transmitters in the area. A band pass filter is used to remove any very low frequency signals (doppler produced by motion of reflection objects, unmodulated signals due to spurious leakage in components, and the like), the high double RF frequency signal and other unwanted RF signals from other RF transmitters in the area. The output of the band pass filter is a voltage that tracks the subcarrier modulation imposed by the tag multiplied by the cosine of the phase angle between the RF signals at the RF and LO ports. A second (quadrature) channel is used as shown in FIG. 1 which tracks the subcarrier modulation imposed by the tag multiplied by the sine of the phase angle between the RF signals at the RF and LO ports. The LO signal applied to the quadrature mixer is shifted in phase by 90 degrees from the LO signal applied to the in phase mixer as shown in FIG. 1.

The phase of a RF signal is influenced by the paths of the signal and components of the system as well the distance between the reader and the tag. Thus, the output of the band pass filter may be zero if the LO and RF signals are in phase quadrature (that is 90 or 270 degrees from each other). This phenomenon is called a 'quadrature null'. The RFID reader of FIG. 1 overcomes this problem. A second channel (Q or quadrature channel) is used with a LO signal shifted 90 degrees from the phase from the LO signal in the first channel (I or in phase channel). Thus, an output signal will appear on at least one of the two channels I or Q. The outputs of these two channels are processed to yield the data sent by the tag for all values of phase, and thus distance to the tag, of the modulated RF signal sent by the tag. The processing of the data is not shown in FIG. 1 and may be accomplished by various methods such as that of Koelle (U.S. Pat. No. 4,739,328).

RFID tags and homodyne readers may be constructed using alternative methods and using alternative components. These may include an RF generator that produces a low-level RF signal that is divided by a power divider, with one part sent to the LO ports of the mixers and the other part amplified and sent to the reader antenna. This alternative avoids the need for a directional coupler. Two reader antennas may be used instead of one. The first antenna transmits RF signals to a tag, and the second antenna receives signals from a tag. Thus, the need for a circulator is eliminated. A directional coupler may be used to direct signals from a tag to the RF ports of the mixers instead of the use of a circulator. Two antennas can be used by a tag, one for receiving, and one for sending the modulated signal to a reader. The tag may modulate the backscattered signal by amplitude modulation, phase modulation or a combination of the two. Any of these methods may be used by a tag with the new readers of the present invention to measure the distance to the tag. The theoretical derivations and explanations that follow are for a tag that uses amplitude modulation. However, any type of modulation may be used. The mathematical details using alternate modulations are similar those presented here and the implementation that the reader uses to measure distance to a tag is identical. More than two receive channels may be used, for example three channels. The homodyne receiver can be constructed using strip line architecture with mixing diodes such as described in U.S. Pat. No. 4,360,810. These and other modulated backscatter RFID systems may use the techniques of the present invention to measure distance to a tag described below and are within the scope of the present invention.

A mathematical description of backscatter signal demodulation of prior art systems may be found in the literature and is summarized and further developed below to explain the operation of the present invention.

To read a tag, a RF generator in the reader produces a RF signal $V_G$:

$$V_G = V_1 \cos(\omega t) \text{volts} \qquad \text{eq (1)}$$

where
 t is time in seconds
 $\omega = 2\pi f$ is the radian frequency of the RF signal in radians per second
 f is the frequency of the RF signal in Hertz (Hz, or cycles per second)
 cos is the cosine function.
 $\pi$=the constant pi=3.14159265 . . .
 Signal $V_G$ is sent to the reader antenna and transmitted. The field transmitted by the reader antenna is:

$$E_T = E_1 \cos(\omega t + \theta_1) \text{volts per meter} \qquad \text{eq (2)}$$

where $E_1$ and $\theta_1$ are the total magnitude and phase respectively resulting from the influence of the components that the signal passes through between the RF generator and the radiated signal including transmission lines, the directional coupler, the circulator and the reader antenna. The factors $E_1$ and $\theta_1$ are functions of frequency and the direction and polarization of the propagating RF signal from the reader antenna. All these effects are contained in the terms $E_1$ and $\theta_1$ and the details are omitted here for brevity and clarity since details are not needed for the present discussion.

The field strength of the radiated signal decreases as the inverse of the distance from the reader antenna. The phase varies due to the propagation of the signal away from the reader antenna and changes by 360 degrees or $2\pi$ radians for each wavelength that the signal travels. The signal arriving at the tag antenna, $E_{RT}$, is:

$$E_{RT} = (E_1/d) \cos(\omega t + \theta_1 kd) \text{volts per meter} \qquad \text{eq (3)}$$

where d=the distance between the phase centers of the reader antenna and the tag antenna in meters
 $k = 2\pi/\lambda$, the RF wave number in inverse meters
 $= \omega/c$
 c=the speed of light=2.99792458E+08 meters per second
 $\lambda = c/f$, the free space wavelength of the RF signal in meters.

Equation (3) is valid in the far field of antennas. The values of distance, d, and phase, $\theta$, are referenced to the location of the phase centers of the reader and tag antennas which can depend on frequency. The method of the present invention accounts for these effects without requiring a priori knowledge of the phase centers of the antennas to calculate the effects.

The tag antenna receives the signal $E_{RT}$, modifies the magnitude and phase, modulates the signal with a time varying function, $F_M(t)$, that is coded according to the data stored in the tag, and sends or reflects the modified signal back toward the reader antenna. The function, $F_M(t)$, can be produced by the time-varying impedance, $Z_M(t)$, attached to the tag antenna. The magnitude of the reflected signal decreases as the inverse of the distance from the tag antenna and the phase varies due to the propagation of the signal away from the tag antenna. The signal arriving at the reader antenna from the tag is:

$$E_{RR} = \{E_2 F_M(t)/d^2\} \cos(\omega t + \theta_2 - 2kd) \text{volts per meter} \qquad \text{eq (4)}$$

where $E_2$ and $\theta_2$ are the total magnitude (except for the modulation term $F_M(t)$) and phase effects of the components that the signal passes through between the RF generator, through the tag, and returning to the reader antenna including transmission lines, the directional coupler, the circulator, the reader antenna, the tag antenna and tag RF circuitry. The effects of the signal propagation from the reader antenna to the tag and from the tag antenna back to the reader are contained in the terms $d^2$ and 2kd. The factors $E_2$ and $\theta_2$ are functions of frequency, the direction and polarization of the propagating RF signal from the reader and tag antennas. All these effects are contained in the terms $E_2$ and $\theta_2$ and the details are omitted here for brevity and clarity since they are not needed for the present discussion.

The reader antenna receives the signal modulated by the tag as well as other unwanted signals. The received signals are sent to Port 2 of the circulator. The received signals include the signal modulated and reflected by the tag as well as signals reflected from objects in the field of the reader antenna and signals from other RF transmitters in the area. The received signals exit Port 3 of the circulator and are sent to the RF ports of the mixers of the homodyne receiver. These signals also include components due to component mismatch, reverse port leakage of the circulator, reflections from objects in the field of the reader antenna and similar sources. The received signal magnitude and phase are affected by the components that the signals pass through.

The received signal at the RF port of the mixers is:

$$V_{RF} = \{V_3 F_M(t)/d^2\} \cos(\omega t + \theta_3 - 2kd) + V_{UM}(\omega, t) \qquad \text{eq (5)}$$

where $V_3$ and $\theta_3$ are the total magnitude and phase effects of the components that the signal passes through between the RF generator and the signal at the RF port of the mixers including transmission lines, the directional coupler, the circulator, the reader antenna, the tag antenna, the impedance modulator in the tag, and others. The factors $V_3$ and $\theta_3$ are functions of frequency and are functions of the direction from and polarization of the reader and tag antennas.

The term $V_{UM}(\omega, t)$ includes all other signals that are not modulated by the tag. This term is included here for completeness. However, individual terms are not developed for brevity and clarity because band pass filters eliminate the demodulated components of these signals as shown in FIG. 1.

The term $F_M(t)$ is the function resulting from the coding of the data stored in the tag. For example, this function may modulate the magnitude of the reflected signal between two levels. The data stored in the tag is coded using one or more of many codes such as 2/2f, FM0, Manchester, pulse width, pulse position, etc. depending on the design of a particular RFID system.

The in phase mixer multiplies the voltage $V_{RF}$ with the signal $\cos(\omega t)$ at the LO port, and the quadrature mixer multiplies the voltage $V_{RF}$ by the signal $\sin(\omega t)$. Here, the reference phase is assumed to be zero at the LO port of the in phase mixer. The phase reference is arbitrary. The use of a phase of zero at the LO port of the in phase mixer simplifies the terms in the equations. The terms that have frequency components lower or higher than the spectrum of $F_M(t)$ are eliminated by the band pass filters. After filtering, the in phase and quadrature signals of in FIG. 1 are:

$$V_I = k_3 \{V_3 F_M(t)/d^2\} \cos(2kd - \theta_3) \quad \text{eq (6)}$$

$$V_Q = k_3 \{V_3 F_M(t)/d^2\} \sin(2kd - \theta_3) \quad \text{eq (7)}$$

where $k_3$ and $V_3$ include all terms that affect the magnitude of the signals excluding $F_M(t)$ and the tag to reader distance d. The reader may process the signals $V_I$ and $V_Q$ to obtain the function $F_M(t)$ for all values of phase. The reader may then decode the signal $F_M(t)$, thus retrieving the data sent by the tag.

The prior art includes a number of methods to attempt to use the magnitude of the modulated received signal to locate the tag. For example, readers may be located at two positions. The magnitude of the signal returned by the tag can be measured at each reader. Then, knowing that the signal strength varies as $1/d^2$, or the power of the signal as $1/d^4$, lines can be constructed that are consistent with the relative strengths of the received signals. Repeating for a third reader provides a triangulation. This method is fraught with difficulty, however, since the magnitude is affected by many factors, most of which are not known or under control. This method is also complex and expensive.

Determining distance using the magnitude of the tag signal measured by a single reader provides poor results. The $1/d^2$ variation in signal strength (or $1/d^4$ in power) can be masked by variations in magnitude due to antenna gain, antenna polarization, uniformity of tag signal strength, etc. The rapid decline with distance of received tag signal strength is one of the elements used in practice to control the general size of the reading zone. Thus, the signal strength returned by the tag is of use, but is not adequate for accurate determination of the distance to a tag.

The phase of the returned signal provides more precision, but the use of phase has other problems. The most challenging of these is that there are many wavelengths of the RF signal between the reader antenna and the tag, and the relationship between the in phase and quadrature signals repeats every wavelength. The present invention provides solutions to this problem and uses the phase of the signals to determine the distance between the reader antenna and the tag to an accuracy on the order of centimeters. To illustrate the fundamental problem of using phase data, consider the condition when the relative amplitudes between the in phase and quadrature signals are preserved and not affected by amplifier compression, limiting, or other such non-linear processes. An angle $\theta_E$ can be calculated from the magnitude of the received in phase and quadrature signals:

$$\theta_E = \arctan(V_I, V_Q) \quad \text{eq (8)}$$

where arctan is the inverse tangent function that returns a value between $-\pi$ to $\pi$ radians ($-180$ to $180$ degrees). However, since the path length is longer than the wavelength of the RF signal, the total phase angle has an additional term of $+-2\pi n$ due to the repetition of the trigonometric functions for every $+-2\pi$ radians (or 360 degrees) change in angle. Thus:

$$2kd - \theta_3 = \theta_E + -2\pi n \quad \text{eq (9)}$$

where n is an unknown integer.

Solving for $d$: $d = (\theta_E + -2\pi n + \theta_3)/2k$ \quad \text{eq (10)}

$$= (\theta_E + \theta_3)\lambda/4\pi + -n\lambda/2. \quad \text{eq (11)}$$

The tag to reader distance cannot be found using equation (11), since the values of n and $\theta_3$ are unknown. Small changes in the tag to reader distance can be measured by changes in the magnitudes of the in phase and quadrature output signals. However, the total distance cannot be found since an unknown integer number of wavelengths may exist between the tag and reader. In theory, the value of $\theta_3$ could be found, measured, or calculated but is of little use since the value of n remains unknown. The present invention solves these problems with methods and readers that measure the distance to a tag as is developed below.

Alternate Approaches to Measuring Distance

The distance to a tag can be determined by measuring the round-trip time for a radio wave to travel from the reader to the tag and back. However, due to regulatory requirements, the modulation placed on the signals from the reader to the tag and from the tag to the reader are restricted to have low bandwidth and provide insufficient precision in timing to allow distance calculation as is done in high bandwidth direct sequence spread spectrum or time of flight systems.

It is possible to modulate the RF interrogation signal sent by the reader by a phase-shift keyed DSSS signal and obtain information of the distance to the tag (Koelle, U.S. Pat. No. 4,888,591), but Koelle s method has not been found to be capable of the precision required for precise tag localization. Thus, this obvious candidate is eliminated for further consideration.

Another candidate is a method to phase modulate (using a direct sequence spread spectrum signal) the signal that the reader sends to the tag followed by up-conversion (or down-conversion) to a new frequency and retransmission by the tag. The reader receives this new signal and calculates round-trip time by correlating the received signal with the transmitted signal. Such a method works, but requires a complex, large and expensive tag, and is unsuitable for simple low-cost modulated backscatter tags.

If one were able to measure the electrical phase inserted in the path due to the propagation of the radio wave, the distance to the tag could be calculated in a straightforward manner. The difficulty of this approach is discussed above and is quantized here. A mixer in a homodyne receiver produces an output voltage that is proportional to the cosine of the angle between the phase of the LO signal, which is a sample of the RF signal transmitted to the tag by the reader, and the phase of the RF signal of the modulated signal reflected by the tag. The homodyne receiver band pass filters eliminate other forms of interference such as reflections from stationary or moving objects in the field of the reader and reception of signals transmitted by other transmitters in the area. The phase of the signal returned from the tag can be measured in the homodyne receiver of the reader, but only to a resolution within $2\pi$ radians or 360 degrees (the whole integer number of wavelengths are lost). With the prior art, it is not possible to measure the number of whole wavelengths between the reader and the tag.

To illustrate, assume the distance between the tag and reader antenna is 3 meters (or 6 meters round trip). The wavelength of a radio wave of 915 MHz is 0.32764 m. Thus, the round trip phase between the reader and the tag is 360*6/0.32764=360*18.313=6592.6 degrees. The cosine of 6592.6 degrees is −0.38366 and the sine is 0.92347. These are the relative strengths of the signals in the I and Q channels, respectively. If one were to calculate the inverse tangent of (x=−0.38366, y=0.92347), the answer is 112.56 degrees +−n*360 where n is unknown. The phase of 112.56 degrees corresponds to a round-trip distance of 112.56*.32764/360=0.1024 meters, or a one-way distance of 0.051 meters. The distance to the tag is one of the numbers: 0.051, 0.215, 0.379, 0.543, 0.707, 0.870, 1.034, 1.198, 1.362, 1.526, . . . , 2.672, 2.836, 3.000, 3.164, 3.328, . . . meters. The correct answer is one of these (3.000 meters), but there is no way with the prior art readers to know that in this case that there are 18 wavelengths in the round trip path from the reader to the tag in addition to the distance (in this case 0.051 meters) calculated from the measurement of phase.

A modulated backscatter RFID reader can make very accurate measurements of differential motion (see also Koelle, A. R., and Depp, S. W., "Doppler radar with cooperative target measures to zero velocity and senses the direction of motion", *Proceedings of the IEEE*, pp 492-493, March 1977). Measurements of signal strength or phase at two different times can be used to calculate the direction of motion (Koelle, U.S. Pat. No. 5,510,795; Brady, U.S. Pat. No. 6,204,765), but the prior art includes no method of directly determining the distance to a modulated backscatter tag of the 'Koelle type' from measurements made by a single reader.

The location of a modulated backscatter RED tag can be estimated by measuring the direction to a tag (Landt U.S. Pat. Nos. 6,476,756 and 6,600,443) at two or more locations and using triangulation.

Another approach is to rely on motion between the reader antenna and tag antenna. The magnitude and phase of the signal returned by the tag can be measured as a function of time. Then, the data can be fit to path of the tag assuming for example that the tag has a constant speed and a linear trajectory. Such a method has been described by Pidwerbetsky (U.S. Pat. No. 6,046,683).

The present invention overcomes all of the problems and constraints of the methods and systems of the prior art and provides an accurate determination of the distance between a reader antenna and a tag. The basis of the new invention are modulated backscatter RFD readers that transmit more than one frequency and process phase information in a new way to measure the distance between the reader antenna and a tag. Various approaches can be used based on the basic concepts of the present invention and several reader designs using these methods are developed below.

Distance Measurement

The phase of the modulated backscatter RF signal from a tag is a function of the distance between the reader antenna and the tag. However, the measurement of phase at a given frequency repeats for changes in distance of every half the RF signal wavelength. Thus, the RF phase can be used to track small changes in tag distance, but not the total distance from a reader. However, the variation of phase with frequency can be used to find tag distance as shown below. Repeating Equation (9):

$$2kd - \theta_3 = \theta_E + -2\pi n \quad \text{eq (9)}$$

Using the identity $k = 2\pi f/c$ and rearranging:

$$4\pi f d/c = \theta_E \theta_2 + -2\pi n \quad \text{eq (12)}$$

Taking the derivative of eq (12) with frequency:

$$4\pi d/c = d\theta_E/df + d\theta_3/df \quad \text{eq (13)}$$

or using the prime symbol to indicate the derivative with respect to f:

$$4\pi d/c = \theta'_E + \theta_3 \quad \text{eq (14)}$$

and solving for d:

$$d = c(\theta'_E + \theta'_3)/4\pi \quad \text{eq (15)}$$

Thus, the tag to reader distance, d, can be found if $\theta'_E$ and $\theta'_3$ are known or can be found. The terms with constant phase including the term $+-2\pi n$ have been eliminated by taking the derivative. Thus, the distance between the reader antenna and the tag can be measured in an unambiguous way if accurate values for $\theta'_E$ and $\theta'_3$ can be determined or measured. The values of $\theta'_E$ and $\theta'_3$ can be estimated using measurements at two or more frequencies with a difference approximation of the derivative. However, methods based on measurements of phase at discreet frequencies introduce ambiguities in the resulting calculated distance. The ambiguities are due to the possible addition of $+-\pi n$ radians to the measurements of the phase angles. The resulting ambiguity in round trip distance is a multiple of half of the wavelength of the frequency which is the smallest difference between frequencies used in the measurement. Uncertainties may be resolved by methods such as use of signal strength, maximum range of a reader and/or by using a swept frequency measurement.

Figure 2:
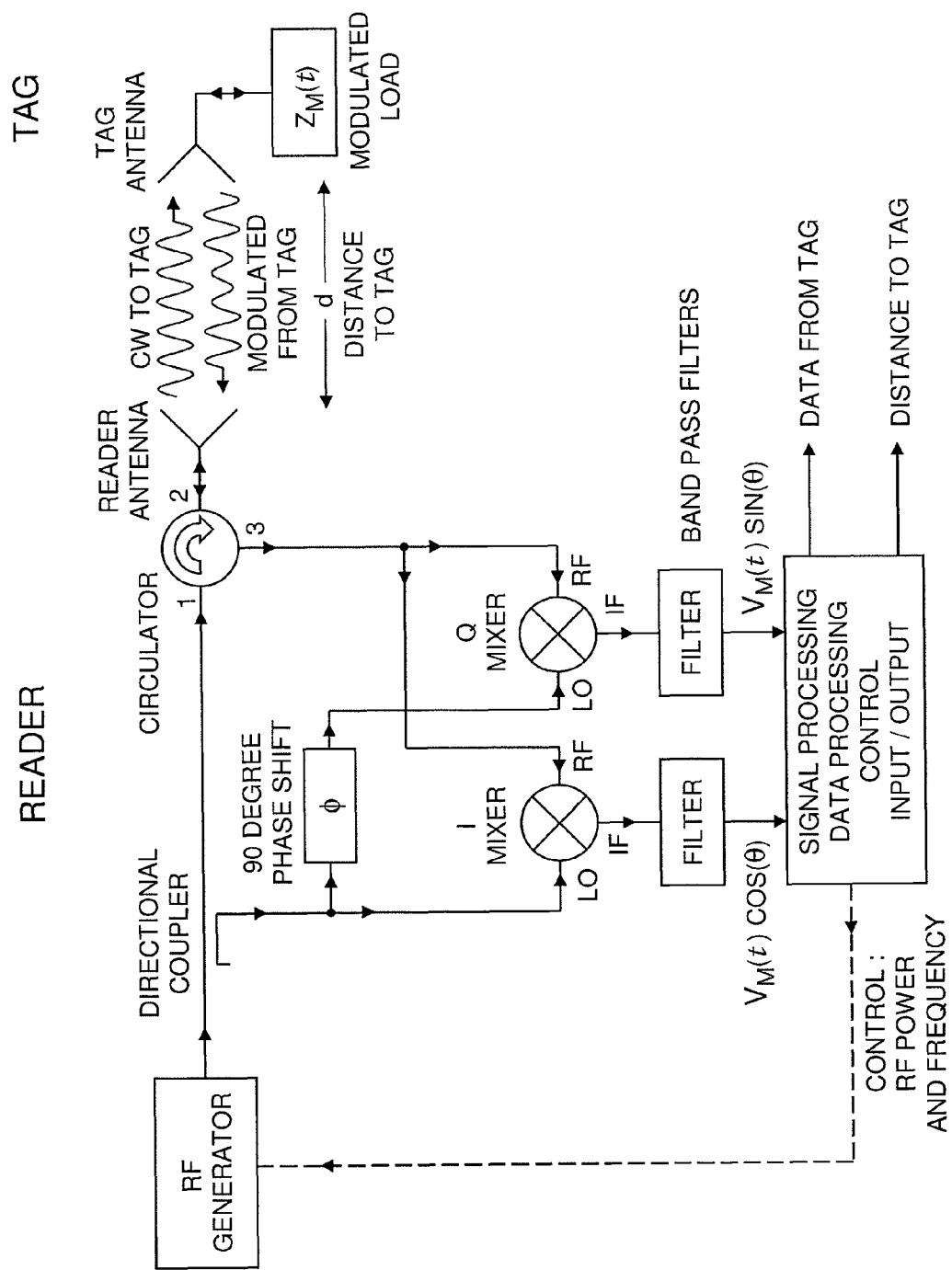
FIG. 2. Is a schematic of a ranging backscatter RFID reader with quadrature homodyne receiver.

The value of $\theta'_E$ can be found from measurement of the magnitude of the in phase and quadrature filtered signals at two or more frequencies using equation (8) or by other methods. The value of $\theta'_3$ can be found using a calibration process that avoids the necessity of prior knowledge of all the parameters that affect the magnitude and phase of the signals in the RFID system. A RFID reader that implements a method based on the approach and equations above is shown in FIG. 2. The homodyne receiver of the reader operates as described earlier. In addition, the reader controls the frequency and power of the RF signals transmitted to the tag and processes the in phase and quadrature signals to calculate the distance between the reader antenna and the tag. The processes performed by the reader are described below.

The electrical lengths between the RF generator and the LO ports of the mixers are much shorter than the electrical length from the RF generator to the tag and return to the RF ports of the mixers. This condition results in a monotonically increasing phase with frequency of the detected IF signals. Typically for UHF and microwave RFID systems, the phase of the IF signals increases linearly with frequency due to the dominance of the term 2kd, or $4\pi df/c$. Changes in tag to reader antenna distance result in corresponding changes in the phase of the IF signals in a linear relation depending on the change of distance measured in wavelengths of the RF signal.

Practical implementation of the methods to measure tag to reader distance of the present invention may pick a stationary reference location and measure changes in distance referred to the reference location. The reference location may the location of the mounting fixture of the antenna, or the front surface of the antenna radome, or some other convenient location. This method eliminates the need to know the location of the phase centers of the antennas.

The tag to reader distance may be found by measuring the frequency dependence of the phase of the IF signal and using this measurement along with the measurement of the frequency dependence of the phase measured with a tag placed at a known calibration location to calculate tag position. Thus, detailed knowledge of the magnitude and phase effects of all the individual components of the system are not needed including the location of the phase centers of the antennas, tag and reader. The RFID system is calibrated, either in the field or at manufacture for systems of fixed geometry such as a hand held reader, or a reader built integral with the reader antenna.

Once the calibration is completed, the distance between the reader antenna and tag may be found using measurements of IF phase for the tag at any location. The method of the present invention solves the problem of the unknown number of whole wavelengths of the RF signal between the reader antenna and the tag.

Repeating Equation (12):

$$4\pi f d/c = \theta_E + \theta_3 + -2\pi n \qquad \text{eq (12)}$$

where $\theta_3$ is a function of f and the measured $\theta_E$ is a function of f and d. An example is given in a following section where the reference location is chosen to be the front surface of the radome of the reader antenna, and the calibration location is chosen to be 3 feet (0.914 meters) from the reference location.

Let $d_0$ be the distance from the reader antenna phase center to the calibration location, and D be the distance of the tag from the calibration location. Then:

$$d = D + d_0. \qquad \text{eq (16)}$$

Using the relationship of equation (16) in equation (12) and rearranging terms:

$$4\pi f D/c = \theta_E + \theta_2 - 4\pi f d_0/c + -2\pi n. \qquad \text{eq (17)}$$

Taking the partial derivative of equation (17) with frequency:

$$4\pi D/c = \theta'_E + \theta'_3 - 4\pi d_0/c. \qquad \text{eq (18)}$$

$$= \theta'_E + \theta'_4 \qquad \text{eq (19)}$$

where $\theta'_4 = \theta'_3 - 4\pi d_0/c$ and is a function of f but not D. For the tag at the calibration location, D=0 and then $$\theta'_4 = -\theta'_{E0} \qquad \text{eq (20)}$$

where $\theta'_{E0}$ is the measured derivative of phase with frequency when the tag is at the calibration location. Solving equation (19) for D, the distance of the tag from the calibration location:

$$D = c(\theta'_E - \theta'_{E0})/4\pi \qquad \text{eq (21)}$$

and thus, the distance between the reader antenna and the tag may be found using measurements of the change in phase with frequency.

A process to measure the distance from the reader antenna to the tag involves:

(1) installation of the RFID system;
(2) calibration which must be repeated if any of the components of the reader system are changed; and
(3) normal operation where the reader provides the distance between the tag and reader antenna as well as the data sent by the tag as shown in FIG. 2.

A method of calibration proceeds:

(1) place a tag at the chosen calibration location in the field of the reader at a known tag to reader antenna distance;
(2) for two or more frequencies, at each frequency, measure the magnitude of the in phase and quadrature signals at the output of the band pass filters, or after amplification by linear amplifiers;
(3) for each frequency, calculate $\theta_E$ using equation (8);
(4) using the values of $\theta_E$ and the frequencies, calculate $\theta'_{E0}$ which is $d\theta_E/df$ at the reference location. Preferably, the value of $\theta_E$ is measured at more than two frequencies, a linear least-squares fit to the data is calculated and the slope of the linear least-squares curve is used for the value of $\theta'_{E0}$.

Optionally, the calibration procedure may be repeated for every type of tag that will be read. If the values of $\theta'_{E0}$ vary between types of tags, that information can be stored in the reader. The tag then includes its tag type in the data sent to the reader, and the reader uses the value of $\theta'_{E0}$ appropriate for that particular tag type in the determination of the tag to reader antenna distance. This embodiment uses the tag to carry data related to the calculation of the distance between reader antenna and tag, but may be implemented without requiring changes in tag hardware.

A method of operation then proceeds:

(1) read a tag at two or more frequencies, and for each frequency, measure the magnitude of the in phase and quadrature signals at the output of the band pass filters, or after amplification by linear amplifiers;
(2) calculate $\theta'_E$;
(3) calculate the distance between the tag and the calibration location using equation (21).
(4) Optionally, if the chosen reference location is not the same as the calibration location, calculate the tag location with respect to the reference location (adding or subtracting the chosen fixed distance as appropriate).

Ambiguities in distance may be removed by consideration of a distance calculated with an additional phase of $n\pi$ added to the phase of any single or multiple measurements and selecting the value of the distance that is consistent with the range of the reader. Alternative methods of measuring distance are possible using the principles herein, including swept frequency measurements of phase that eliminate ambiguities as is shown later herein.

The functions described above are performed by the Signal and Data Processing section of the reader in FIG. 2.

The previously presented method assumes that the tag is stationary. The value of $\theta_E$ changes with changes in frequency and in tag position, and thus, using the RFID reader of FIG. 2, the accuracy may deteriorate when the tag is in motion because the tag distance will change as the measurements are made. This problem is solved by determining $\theta'_E$ using simultaneous measurements at two frequencies. A reader to make simultaneous measurements at two frequencies is shown in FIG. 3.

Figure 3:
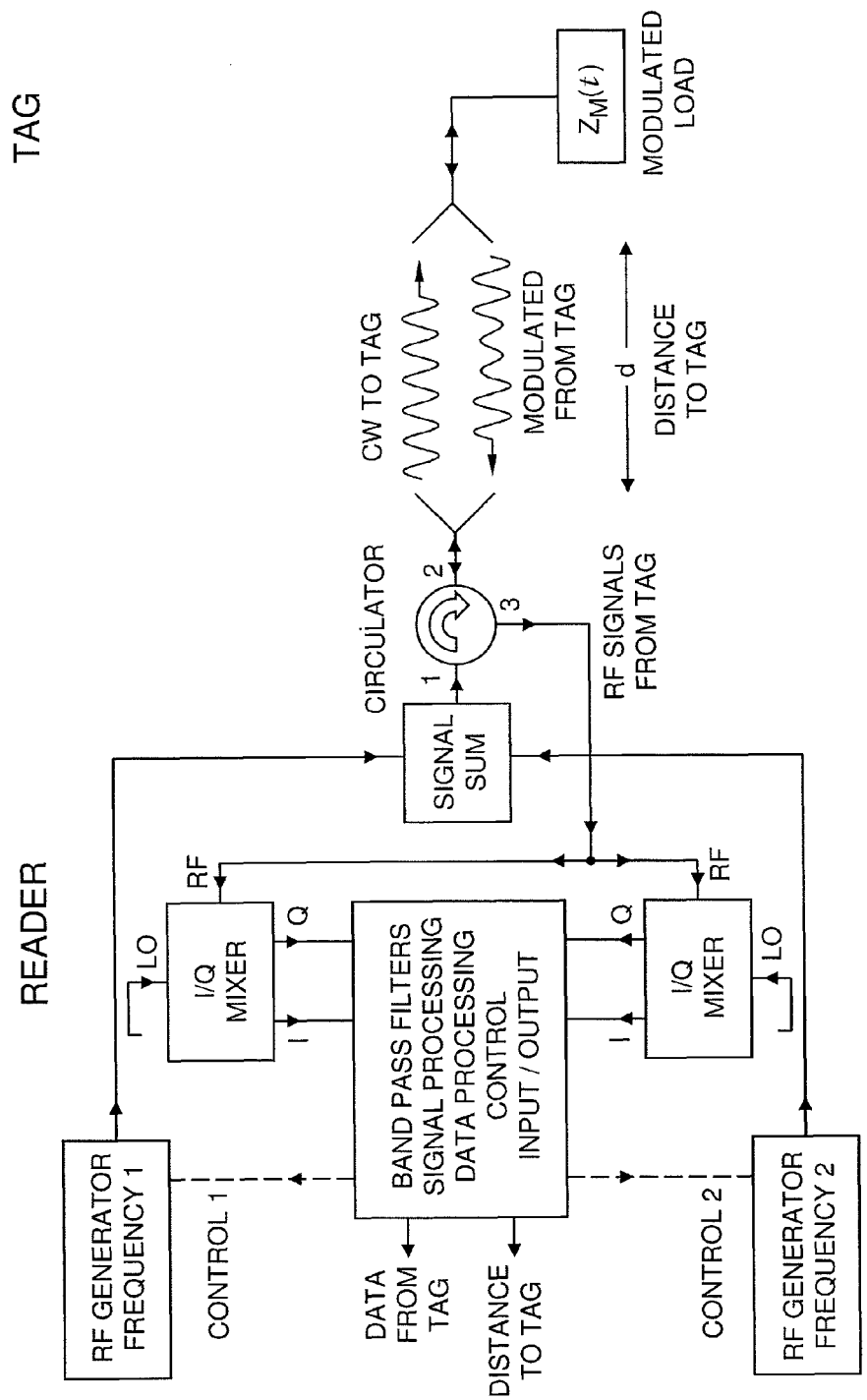
FIG. 3. is a schematic diagram of a two frequency two channel ranging backscatter quadrature homodyne reader.

The reader shown in FIG. 3 contains two separate RF generators and homodyne receivers. The reader sends two RF signals of different frequencies simultaneously to the tag. The tag modulates both signals simultaneously and reflects the signals back to the reader. The reader processes the combined return signals using two homodyne receivers, each using a LO signal that is obtained from one of the transmitted signals. Individually, the homodyne receivers operate in the normal fashion as described earlier in the description above. The two RF frequencies are chosen so that the sum and difference frequencies generated by the mixers are outside the pass band of the band pass filters. Thus, the band pass filters in each receiver eliminate signals and interference due to the other RF frequency.

Thus, the phase of the return signals are determined simultaneously at two frequencies. The reader calculates the derivative of phase with frequency at any desired time independent of the motion of the tag. The derivative of phase with frequency is approximated by a difference in phase with frequency. The calibration and measurement procedures described above are performed simultaneously for each of the channels of the reader in FIG. 3.

Accuracy may be improved by using various combinations for the two frequencies, tracking the calculated position with time, and further processing the location information. Preferably, the Signal and Data Processing section of the reader contains calibration modes to perform the calibration procedure and calculations and operational modes to subsequently measure the distance to the tag.

EXAMPLE

Figure 4:
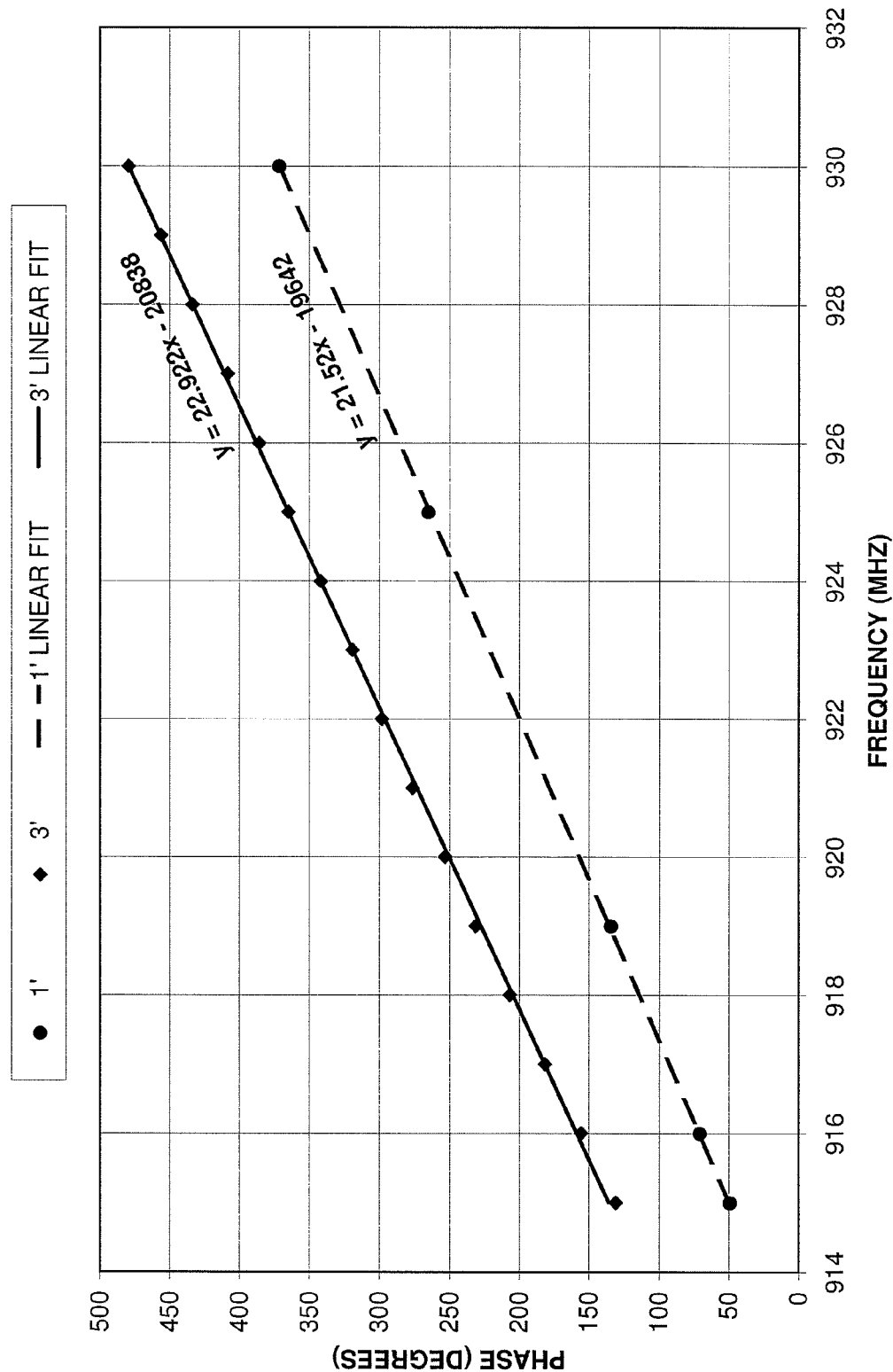
FIG. 4. is a graph showing phase of the IF signal in a modulated backscatter RFID system for reader antenna to tag distances of 1 foot and 3 feet.

A modulated backscatter RFID reader was used to measure the phase of the signal returned by a tag at a distance of 3 feet from the front surface of the reader antenna as a function of RF frequency. A second set of measurements was made at a distance of 1 foot from the front surface of the reader antenna. The details of making these measurements is provided in a following section. The results are shown in FIG. 4.

Measurements were made at frequencies between 915 MHz and 930 MHz. A least squares linear fit to the data was calculated. The derivative of phase with frequency was found to be 22.922 degrees per MHz for a reader antenna to tag distance of 3 feet.

The calibration location of 3 feet from the front surface of the reader antenna radome is chosen. The front surface of the radome of the reader antenna is chosen as the reference location. Thus, $\theta'_{E0} = 22.922$ degrees per MHz.

The tag was repositioned and the derivative of phase with frequency was found to be 21.52 degrees per MHz for the tag located 1 foot from the reader antenna. The least squares fit to the measured data is shown in FIG. 4. The slope of the curve is 21.52 degrees per MHz. Thus, $\theta'_E = 21.52$ degrees per MHz.

Substituting these values into equation (21) and using MHz and degrees instead of Hz and radians, $$D = \text{tag distance from calibration location}$$
$$= 300(21.52 - 22.922)/720$$
$$= -0.584 \text{ meters}$$
$$= -1.92 \text{ feet}$$

or the tag location, d, is $$d = \text{distance from reference location to calibration location} + D$$
$$= 3 - 1.92$$
$$= 1.08 \text{ feet}$$

resulting in an error of 1 inch. Some of this error may be attributed to the closeness of the tag to the reader antenna. At the frequencies used, the tag is considered to be in the far field of the reader antenna at a distance of 1 foot or greater. The conventional boundary between near field and far field is based on the behavior of the magnitude of fields and not the phase. At the distance of 1 foot, phase differences can be several degrees between the actual phase and the phase extrapolated from far field. However, an accuracy on the order of centimeters has been demonstrated.

Figure 5:
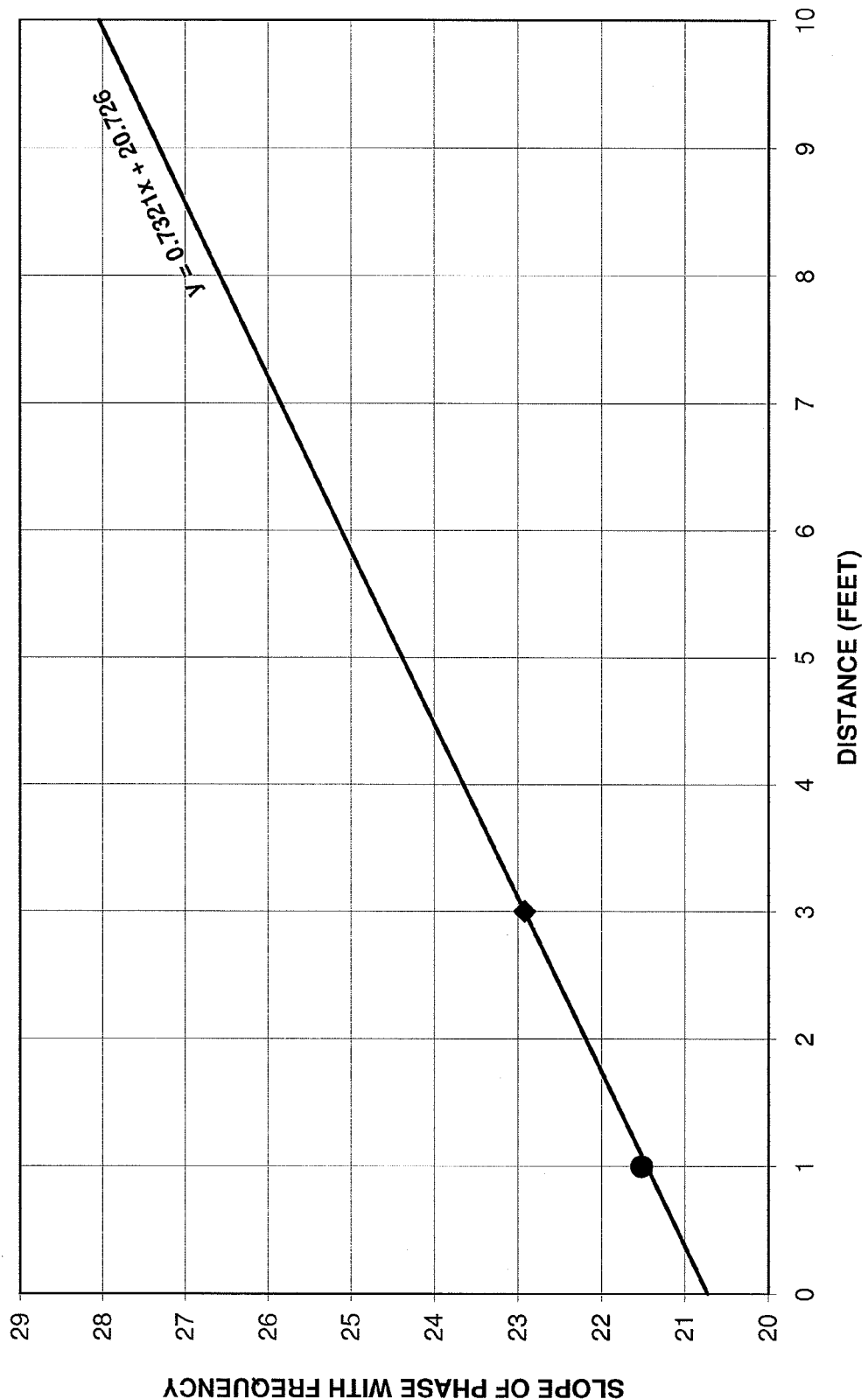
FIG. 5. is a graph showing the linear relationship between the distance and derivative of phase with frequency.

The derivative of phase with frequency is a linear function of distance as shown by equation (21). This relationship is shown in FIG. 5 for the example discussed above. Repeating equation (21):

$$D = c(\theta'_E - \theta'_{E0})/4\pi \qquad \text{eq (21)}$$

Rearranging to find $\theta'_E$ as a function of D:

$$\theta'_E = 4\pi D/c + \theta'_{E0}$$

Using degrees instead of radians and MHz and feet instead of meters, $$\theta'_E = 720D/(3.28*300) + \theta'_{E0} = 0.7321D + \theta_{E0} \text{ degrees per MHz}$$

For the system of the previous example, the value of $\theta'_E$ was found to be 22.922 degrees per MHz when the tag is 3 feet from the front surface of the reader antenna radome. At this calibration location, D=0 and $\theta'_E = \theta'_{E0} = 22.922$.

Defining distance d as the distance to the tag from the reference location (front of the reader antenna radome in this example), $$d = D + 3 \text{ feet}$$

and then $$\theta'_E = 0.7321(d-3) + 22.922 = 0.7321d + 20.726 \text{ degrees per MHz}.$$

This equation is plotted in FIG. 5. Also shown on FIG. 5 are the two data points of this example. The value of d (the distance to the tag in relation to the front surface of the reader antenna) is $$d = 1.37 d\theta/df - 27.32 \text{ feet}.$$

The distance between the reader antenna and the tag can be calculated using the equation above or from the curve of FIG. 5 with a measurement of the derivative of phase with frequency. The new reader of FIG. 2 measures the distance to a tag by controlling the RF frequency of the signal sent to a tag, by measuring the phases of signals modulated and backscattered by a tag, and by calculating the distance to a tag from the equation above or optionally, through a lookup procedure using the curve shown in FIG. 5 using the calibration data of the reader installation.

Distance Measurement

Using Limiting Amplifiers

Alternate Theoretical Approach:

RFID readers are often constructed using limiting amplifiers. Limiting amplifiers are useful for suppressing weaker signals from other tags in the field of the reader and also for eliminating the need for amplifier linearity over the vary wide range of magnitude of received signals. For example, a tag may enter the reading zone at a distance of 30 meters or more, and pass within 0.5 meter of the reader. A 60-to-1 variation in distance corresponds to a variation in received signal strength of over 70 dB. Since the information in the modulation is derived from timing and not magnitude, limiting amplifiers function well in modulated backscatter RFID readers. However, use of limiting amplifiers preclude the use of the amplified outputs of the I and Q channels to calculate a phase, since amplitude information of the I and Q channels are lost in the limiting process. Distance can be measured between a tag and a reader antenna in a modulated backscatter RFID system using limiting amplifiers as described below.

Summarizing the operation of a modulated backscatter RFID system, an unmodulated RF signal is sent by the reader to a tag. The tag modulates the reflectivity of the tag antenna with a modulation signal of $F_M(t)$. The operation of homodyne RFID systems is well known and was reviewed above. Clutter and interfering signals are rejected, and the output of the homodyne receiver is a detected signal of:

$$V_I(t) = V_M(t)\cos\theta \qquad \text{eq (22)}$$

where $\theta$ is the difference in phase angle between the phase of the reference RF signal in the receiver (LO signal) and the phase of the RF carrier signal reflected by the tag. The notation $V_I$ is used to denote the 'in phase' signal.

Because of the 'quadrature null' effect, the output is zero if θ is 90 degrees or 270 degrees. Common practice is to use an I/Q receiver, where the quadrature (Q) channel uses a reference LO signal that is 90 degrees from the in phase (I) LO signal. The output of the quadrature channel is:

$$V_Q(t) = V_M(t) \sin\theta \qquad \text{eq (23)}$$

The phase angle of the RF signal modulated by the tag can be calculated by using these two detected signals. Define the calculated (estimate) of the phase angle as $\theta_E$. This angle is:

$$\theta_E = \arctan[V_I(t), V_Q(t)] \qquad \text{eq (24)}$$

where arctan is the inverse tangent function that returns an angle between −180 to +180 degrees (or −π to +π radians).

Then the total phase, $\theta_T$, is $$\theta_T = \theta_E + 2\pi n \qquad \text{eq (25)}$$

where n is an unknown positive integer. The round trip distance to the tag can be calculated by multiplying $\theta_T/2\pi$ by the wavelength of the RF signal. This calculation cannot be done because the value of $\theta_T$ is unknown since n is unknown. An approach is presented below as an alternative to the previous derivation resulting in Equation (21).

The components of $\theta_T$, the phase due to the electrical length of the path between the homodyne receiver and the tag, consist of two parts:

Part 1: Phase due to things such as components, cables and transmission lines which includes transmission lines in the tag between the tag antenna, the modulator in the tag and effects of the reader and tag antennas. This term is a function of frequency. For calculation purposes, assume that this term can be represented by a fixed, but unknown, electrical length which may be described by an equivalent length of a signal in free space either in meters, degrees, radians, or wavelengths as desired.

Part 2: Phase due to free space propagation from the reader antenna to the tag antenna. This phase changes as the tag moves, and is the corresponding length that is desired to be measured. This term is a function of frequency and distance from the tag to the reader.

The electrical lengths can be expressed as:

$$L_T = L_F + L_{RT} \qquad \text{eq (26)}$$

Where $L_T$ represents the total path length, $L_F$ represents the phase in the system not affected by tag to reader distance and $L_{RT}$ is the path length between the reader antenna and the tag. Then, the total round trip phase is:

$$\theta_T = 4\pi L_T/\lambda \qquad \text{radians eq (27)}$$

where λ, is the free space wavelength in meters. This equation reflects the fact that the phase changes by 2π radians (or 360 degrees) for each wavelength traveled by the signal, both from the homodyne receiver to the tag and return. Expressing the phase in terms of frequency, f:

$$\theta_T = 4\pi f/c \qquad \text{eq (28)}$$

where c is the velocity of light in free space.

As noted earlier, the sine and cosine of $\theta_T$ can be measured in a homodyne receiver, but the total value of $\theta_T$ is indeterminate by multiples of 2π. The in-phase and quadrature signals detected in the homodyne receiver are related to the phase by:

$$V_I(t) = V_M(t) \cos\theta_T \qquad \text{eq (29)}$$

and $$V_Q(t) = V_M(t) \sin\theta_T \qquad \text{eq (30)}$$

An estimate of the phase angle of the RF signal modulated by the tag can be calculated by using these two detected signals. Define the calculated (estimate) of the phase angle be $\theta_E$. This angle is:

$$\theta_E = \arctan[V_I(t), V_Q(t)] \qquad \text{eq (31)}$$
$$= \theta_T + -2\pi n \qquad \text{eq (32)}$$
$$= 4\pi L_T f/c + -2\pi n \qquad \text{eq (33)}$$

Where $L_T = L_F + L_{RT}$.

The constant term of 2πn can be eliminated by taking the derivative of the equation for $\theta_E$ by f:

$$d\theta_E/df = 4\pi L_T/c. \qquad \text{eq (34)}$$

Solving for the desired parameter, $L_T$:

$$L_T = (c/4\pi)^*(d\theta_E/df). \qquad \text{eq (35)}$$

Once the value of $L_T$ is known, the distance to the tag can be found by subtracting the fixed electrical length from $L_T$. The fixed electrical length can be found by calibrating the reader using measurements made with a tag at known distance from the reader antenna. Optionally, the tag type can be coded into the data stored in each tag, so a calibration number can be found for each tag type if necessary for improved precision. The tag-to-reader distance can be calculated from:

$$L_{RT} = L_T - L_F \qquad \text{eq (36)}$$

$$= (c/4\pi)^*(d\theta_E/df) - L_F. \qquad \text{eq (37)}$$

Thus, the method to measure the tag-to-reader distance consists of measuring the derivative of the phase change with frequency and subtracting a constant.

To calibrate, place a tag at a known position $L_{RT}$. Then measure $d\theta_E/df$ and calculate $L_F$:

$$L_F = (c/4\pi)^*(d\theta_E/df) - L_{RT}. \qquad \text{eq (38)}$$

A key of the invention is to measure the rate of change of phase with frequency instead of using measurements of phase alone as in the previous art. The use of the rate of change of phase with frequency removes the unknown number of integer RF wavelengths that prevent using phase data alone as in the previous art. Another key to the invention is that the use of a cooperative target (a tag that is providing a specific modulation) which permits the reflection from the tag to be acquired in the presence of background signals and links the measurements with the particular tag that is simultaneously read. The invention is also useful to measure the distance to multiple tags in the field if the tags can be separated by time, antenna pattern, or command (the reader commands a particular tag to respond).

This method provides an unambiguous measurement of distance to a tag. However, readers can estimate the derivative of phase with frequency by using measurements of phase sampled at two or more discrete frequencies. In this case, ambiguities can arise. This topic is discussed elsewhere herein. The theory provides that the plots of phase with frequency are straight lines, with a slope depending on the distance between the tag and the reader.

A reader of the present invention implements a method consisting of:

1. Calibrate the system to find $L_F$ through calculations using measurements of phase of the modulated backscatter signal from a tag with the tag at a known location. 2. To find the location of a tag, measure the phase of the signal from the tag at two or more frequencies. 3. Calculate a 'best fit' of the data using a straight-line approximation. 4. Calculate the slope of this line. 5. Calculate the tag-to-reader distance using the equation given above.

The accuracy of the method improves with the number of measurements. A 'least-squares' fit of the data removes measurement uncertainties. Accuracy better than 0.5 inches (1.2 cm) has been demonstrated. Measurements are needed at two frequencies or more.

Several techniques are useful for determining the rate of change of phase with frequency. Some are suitable for use with homodyne receivers using limiting amplifiers. If the tag is in motion, accuracy degrades if the measurements are made slowly. When the tag to reader distance changes with time, the phase is changing in time as well as frequency. The method can be extended to estimate this effect as well, or to accommodate the effect. The velocity of the tag can be found by other means such as presented in U.S. Pat. No. 5,510,795.

Several embodiments are described below:

Measurement of Quadrature Nulls by Phase Insertion

Figure 6:
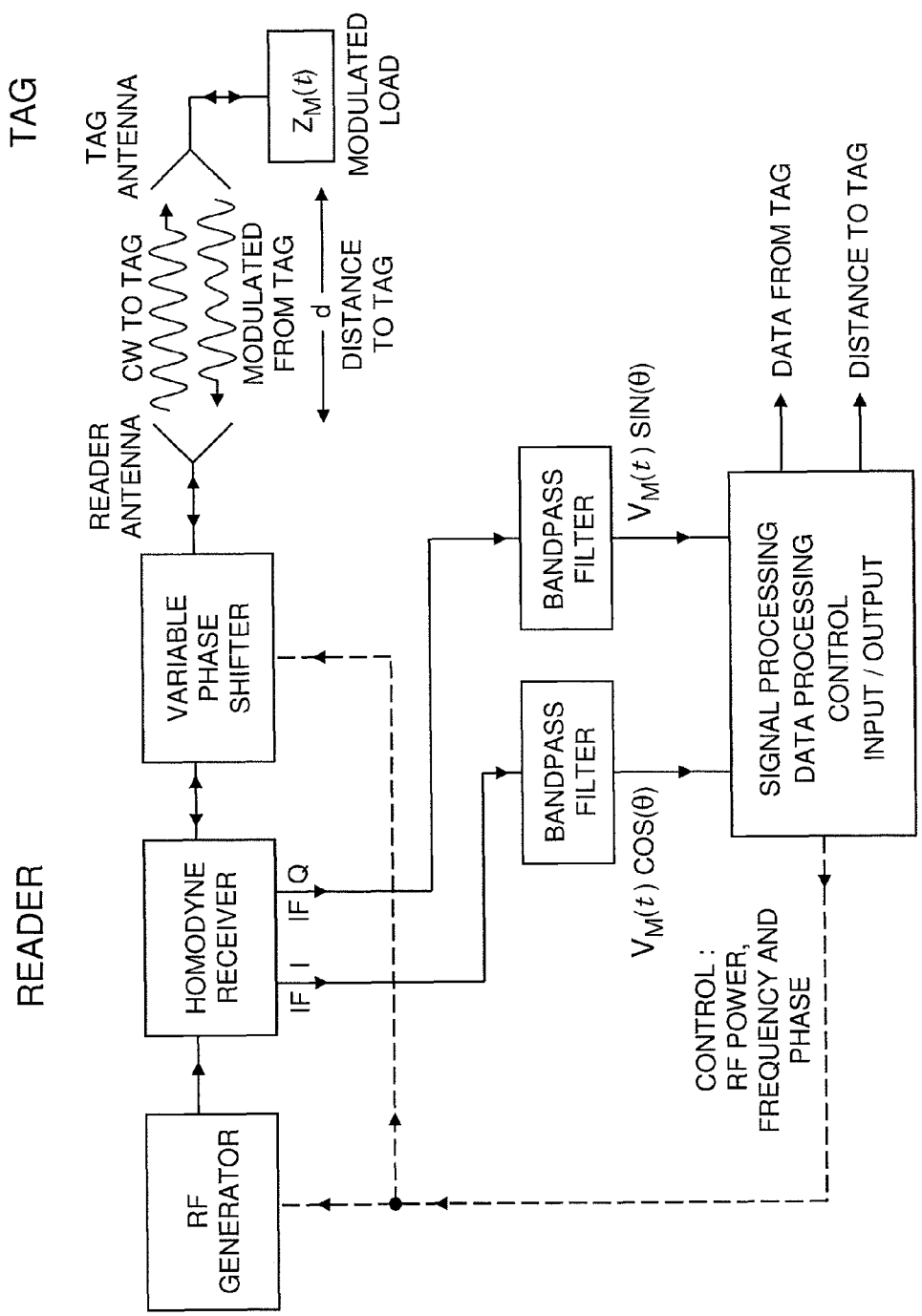
FIG. 6. is a schematic of a ranging backscatter RFID reader with variable phase shifter.

This method is suitable for homodyne receivers using limiting amplifiers as well as those using linear amplification, A/D converters and DSPs. The method consists of measuring the amount of added phase required to place a channel into a quadrature null. A quadrature null occurs when the received signal and the reference signal are 90 degrees from each other in a homodyne receiver. The magnitude of the signal in this case drops to zero and is easily observed or measured, thus the condition of being in a quadrature null is a good indication of a phase condition that can be determined with minimal errors. The measurement is performed at several frequencies, developing a curve of phase with frequency. The slope of this curve is determined and used as outlined above to calculate the distance to the tag. A reader that implements this method is shown in FIG. 6.

The reader controls the output of the RF generator power and RF frequency. The reader Data Processing section determines whether the in phase channel is in a quadrature null. This is done by the reader inability to decode the in phase IF signal since it contains only noise. If a quadrature null is observed, the reader records the phase of the variable phase shifter. If a quadrature null is not observed, the reader adjusts the variable phase shifter until the in phase channel is in a quadrature null condition. Thus, the inserted phase to reach a quadrature null is determined. The original unperturbed phase is twice the negative of the added phase resulting in a quadrature null. Optionally, the quadrature channel may be processed similarly, but each channel is processed independently.

The reader then changes the RF frequency and the process is repeated. Thus, the change in RF phase resulting from the change in RF frequency is calculated and used as an approximation of the derivative of phase with frequency.

The reader may change the phase in discreet steps or may sweep the phase. Abrupt changes in phase may result in loss of the ability to decode the tag signal due to transients. To avoid this loss, the reader may sweep the phase in a non-discontinuous manner to avoid abrupt changes in phase.

The steps of the method are calibration followed by operation.
To calibrate the RFID system: 1. Place a tag at a known, measured distance from the reader antenna, $L_{RT}$ (d of FIG. 6). 2. Set the RF Generator to a first RF frequency. 3. Adjust the phase of the Variable Phase Shifter to obtain a quadrature null for the I channel. 4. Record a first phase angle as −2 times the inserted phase (for passage twice through shifter) 5. Repeat for the quadrature channel (optional) 6. Repeat steps 1 through 4 for a second RF frequency, providing a second phase angle. 7. Calculate $d\theta_E/df$=(second phase−first phase)/(second frequency/first frequency) 8. Calculate $L_F=(c/4\pi)*(d\theta_E/df)-L_{RT}$ The estimate of $d\theta_E/df$ may be optionally improved by measuring the phase at several frequencies, fitting a straight line to the resulting curve of phase versus frequency, and taking the slope of the line as $d\theta_E/df$. The value of phase will increase with RF frequency. If measurements indicate otherwise, the frequency difference between the first and second frequencies has resulted in an ambiguity of phase. A phase of 90 degrees (or $\pi/2$ radians) can be added to the phase shifter value (or 180 degrees or $\pi$ radians to the phase). This artifact is discussed later.

Once the system is calibrated, the distance to a tag can be measured by repeating steps 2 through 7 above with a tag at any location and then calculating the distance to the tag:

$$L_{RT}=(c/4\pi)*(d\theta_E/df)-L_F. \qquad \text{eq (39)}$$

Data were obtained for a tag placed 3 feet (0.914 meter) and 1 foot (0.305 meter) away from a reader antenna. The phase data shown in FIG. 4 was obtained using the reader shown in FIG. 6. At each frequency of measurement, the phase was measured by finding the additional two-way phase required to obtain a quadrature null. The phase data and a least squares linear fit to the data are shown in FIG. 4. This process can be accomplished electronically by using a voltage-control phase shifter, ramping the phase, determining the condition of a quadrature null using the method and circuitry of Koelle (U.S. Pat. No. 4,864,158), and recording the phase corresponding to the quadrature null. A circuit or microprocessor controls the phase shifter, records the measurement of phase and processes the data.

The data of FIG. 4 can be used for calibration. First, the data measured for a 3 feet tag to reader distance will be analyzed. A linear curve was fit to the data using a least squares method. The resulting derivative of inserted phase with frequency is 22.922 degrees/MHz, or $4.001\times10^{-7}$ radians/Hz. Then, $L_F$ is:

$$L_F = L - L_{RT} \qquad \text{eq (40)}$$

$$= (c/4\pi)*\left(\frac{d\theta_E}{df}\right) - 0.914 \qquad \text{eq (41)}$$

$$= 2.998\times10^8 * 4.001\times10^{-7}/4\pi - 0.914 \qquad \text{eq (42)}$$

$$= 9.544 - 0.914 \qquad \text{eq (43)}$$

$$= 8.630 \text{ meters.} \qquad \text{eq (44)}$$

Calibration may be improved further by repeating the calibration procedure for another tag to reader spacing. The tag was repositioned at a distance of 1 foot (0.305 meter) from the reader antenna. The resulting measurements of phase are also shown in FIG. 4. A linear curve was fit to the data using a least squares method. The resulting derivative of phase with frequency is 21.520 degrees/MHz, or $3.756\times10^{-7}$ radians/Hz. Then $L_F$ is:

$$L_F = L - L_{RT} \qquad \text{eq (45)}$$

$$= (c/4\pi)*\left(\frac{d\theta_E}{df}\right) - 0.305 \qquad \text{eq (46)}$$

$$= 2.998\times10^8 * 3.756\times10^{-7}/4\pi - 0.305 \qquad \text{eq (47)}$$

$$= 8.960 - 0.305 \qquad \text{eq (48)}$$

$$= 8.656 \text{ meters.} \qquad \text{eq (49)}$$

The average of the values found for the 3 foot and 1 foot locations is $L_F$=8.643 meters. This value has little physical significance. A fixed distance was used to represent the influence on phase of all the elements in the RFID system that affect phase other than the distance between the tag and reader.

Measurements of the phase of quadrature nulls can now be made for any position of a tag within the reading zone of the reader, and the tag to reader distance can be calculated. The choice of frequency separation influences the accuracy and ease of measurement and calculation. Resolution and accuracy of phase measurements may degrade the reliability of the measurement of the tag to reader distance if the frequency separation used is too small.

If the frequency separation is too large, an ambiguity of distance can arise that is on the order of a half of a wavelength of a frequency that is the difference frequency between the two RF frequencies used for the measurement. As shown in the example above of an alternative calibration procedure, measurements made at more than two frequencies can improve the estimation of tag to reader distance. Analysis of errors show that measurement errors in phase of up to 10 degrees can be accommodated using frequency separations of about 5 MHz for modulated backscatter RFID readers operating in the 915 MHz band to correctly determine the location of a tag in a toll collection system which requires accuracy of a meter.

An experimental implementation of the reader of FIG. 6 was used to obtain measurements and study the practical aspects of the invention. A laboratory RF generator was used to supply the RF signal for the reader and allowed control of frequency and power. A commercial RF module, TransCore AR2200, was used as the homodyne receiver and provided access to the filtered and preamplified IF signals. A Sinclair log periodic antenna was used for the reader antenna. A Narda Model 3752 precision coaxial phase shifter provided control of the phase inserted between the receiver and the reader antenna and provided approximately a 0.5 degree resolution. A commercial TransCore tag was used. The AR2200 RF Module provides a balanced differential pair of signal lines for each of the in phase and quadrature IF channels. An oscilloscope was used to monitor the in phase IF signal. With the high gain of the preamplifiers, the condition of a quadrature null is easily detected.

The data for the example above was obtained in a non-reflecting environment. The tag was placed at a fixed distance from the front surface of the reader antenna. The gain of the antenna is 8.1 dBi, which results in far field conditions $2D^2/\lambda$ at a distance Of greater than 0.33 m. The tag was placed at 3 feet (0.915 m). The range of the phase shifter is slightly less than 180 degrees at 915 MHz. Quadrature nulls will occur for every 180 degrees change in round trip phase change (or 90 degrees of inserted phase). Thus, one expects two null conditions to be measured except if a measured phase is near 0 or 90 degrees since then the phase shifter will not have enough range to reach another quadrature null.

Figure 7:
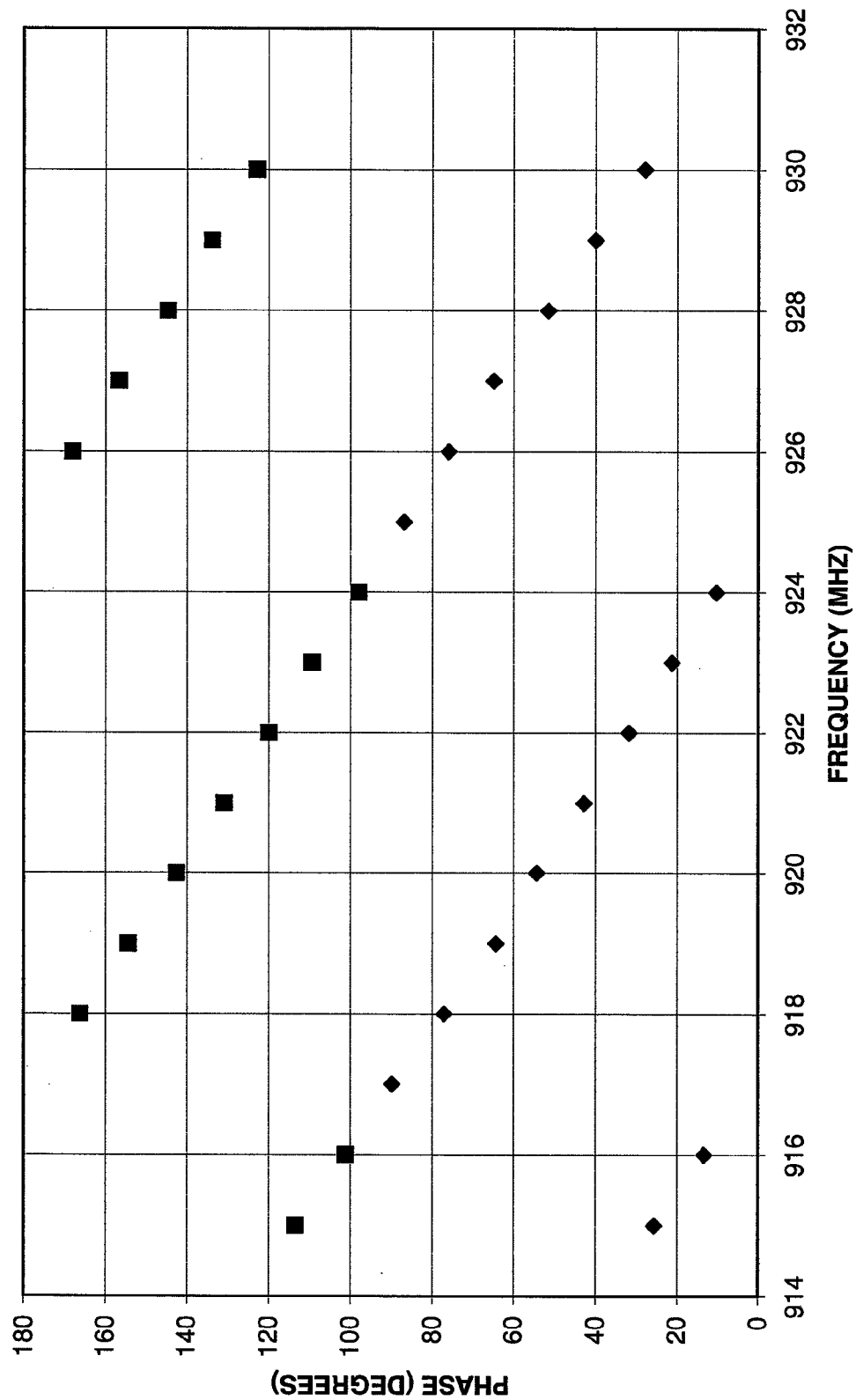
FIG. 7. Is a graph showing inserted phase to obtain quadrature null condition for a reader antenna to tag distance of 3 feet.

The frequency was set, and the phase recorded from the phase shifter for every quadrature null observed. The data is shown in FIG. 7. The inserted phase for the first or lower readings are indicated by diamonds, and the second or higher readings by squares. The phase shifter did not have enough span to reach the other quadrature null at 917 and 925 MHz.

The actual phase of the signal returned from the tag is twice the negative of the values shown in FIG. 7. Extra phase is inserted in the transmit and received signals to reach the quadrature null, so the unperturbed phase is the negative of the twice the inserted phase. The data were processed by subtracting 90 degrees from the upper set of data, averaging the data for each frequency, and multiplying by minus 2. The data were then ordered by adding multiples of 180 degrees to obtain a linear monotonic curve. The resulting data are shown in FIG. 4. These complexities are due to the wide range of frequencies of the measurements used here. In practice, a smaller spread in frequency is used. A 2 to 5 MHz spread is adequate and results in reduced computations to find the derivative of phase with frequency. A least squares fit to the data is also shown in FIG. 4. The resulting relationship is $$\theta = 22.922f - 20838 \text{degrees per MHz} \qquad \text{eq (50)}$$

The calibration proceeds using equations (40)-(44).

Measurements were repeated for a reader antenna to tag distance of 1 foot. The resulting phase is shown in FIG. 4. The reader antenna to tag distance may now be found using equation (39) and the calibration value found ($L_F$).

Ambiguity of Distance

Distance to a tag can be found using the derivative of phase with frequency. The phase may be sampled at two or more frequencies. Representative data using the phase insertion method are shown in FIG. 7. The data of FIG. 7 were processed as described to produce a monotonically increasing straight line of FIG. 4 by assuming that the function of phase with frequency followed straight lines and by connecting the closest neighbors of points of data.

An alternate exists, however. Other straight lines can be constructed from the measured data by adding multiples of 180 degrees or more to any data point. The resulting lines have much steeper slope than the one plotted in FIG. 4. The data of FIGS. 4 and 7 were sampled at 1 MHz intervals. Adding 180 degrees round trip at about 1 MHz intervals produces another straight line with a slope of 180 degrees per MHz steeper than that of FIG. 4. This results in an inserted extra distance of 150 meters round trip or 75 meters one-way for the data of FIGS. 4 and 7 that are sampled at 1 MHz intervals. This solution is discarded since the reader that was used was very low power and has a reading range much less than 75 meters.

If a reader can resolve the phase angle within +−180 degrees (to an angle in one of the four quadrants), then the ambiguity in one way distance to the tag is 150 meters for measurements made with RF frequencies 1 MHz apart. This distance is a one-way trip length of half a wavelength of the difference frequency.

The result is that if the data are taken from samples at various frequencies, ambiguities in distance result that are a quarter or a half (depending on technique) wavelength in length of the smallest frequency difference between the samples. Thus, using a small increment in RF frequency can help eliminate ambiguities in distance. However, small differences in frequency result in small differences in phase for tags at normal distances, and measurement accuracy suffers. Thus, the frequency difference should be chosen taking into account the maximum distance the reader can read a tag, the accuracy of the reader's ability to measure phase, and the accuracy of distance required and other considerations needed for a practical system such as how many lanes are to be monitored in a toll collection system.

A reader may make measurements at three RF frequencies to resolve ambiguities as is shown below. A wide frequency separation is good for accuracy, a small frequency separation is good for reducing the possibility of ambiguity (since the range of a reader is limited). For example, a reader takes measurements of the phase of the backscattered signal from a tag at three frequencies: 915, 916 and 915.1 MHz to a resolution of 0.5 degrees. The measured phases in this example are 203.0, 239.0, and 206.5 degrees respectively. The reader calculates the total distance to the tag using equation (35).

Using the measurements made at 915 and 916 MHz, the total distance to the tag is $L_T=300*[(239.0-203.0)/1]/720=15$ meters. The measurement has an ambiguity of $L_A=(300/2)/1=150$ meters. Thus, the tag could be at a distance of 15 or 165 meters and produce the phases measured at 915 and 916 MHz. Normally, the 165 meter point would be discarded for readers that can read tags at much less than this distance. However, this assumption may be checked using the data for 915 and 915.1 MHz. Using the measurements made at 915 and 915.1 MHz, the total distance to the tag is $L_T=300*[(206.5-203.0)/0.1]/720=14.6$ meters. The measurement has an ambiguity of $L_A=(300/2)/0.1=1500$ meters. Thus, the tag could be at a distance of 14.6 or 1514.6 meters and produce the phases measured at 915 and 915.1 MHz. Accuracy suffers in this case due to the small change in phase that is due to a change in frequency of 0.1 MHz. However, the best estimate of total distance to the tag is 15 meters.

A reader should not simultaneously transmit signals only 0.1 MHz apart since the beat frequencies may interfere with the base band signals of the modulation produced by the tag. Thus, the example above can be implemented on a stationary tag that transmits a single RF frequency at a time and sequences between frequencies. If the tag is moving, then simultaneous transmission of at least two frequencies is required to mitigate the effects of tag motion. In the case above, the reader first transmits RF frequencies of 915 and 916 MHz, and then at 915 MHz and 916.1 MHz. The reader measures the same phases as listed above and in addition measures a phase of 242.5 degrees at 916.1 MHz. This type of sequence is compatible with tags moving at high velocity using the reader of FIG. 3.

As above, using the measurements made at 915 and 916 MHz, the total distance to the tag is $L_T=300*[(239.0-203.0)/1]/720=15$ meters. The measurement has an ambiguity of $L_A=(300/2)/1=150$ meters. Thus, the tag could be at a distance of 15 or 165 meters and produce the phases measured at 915 and 916 MHz. Using the measurements made at 915 and 916.1 MHz, the total distance to the tag is $L_T=300*[(242.5-203.0)/1]/720=14.96$ meters. The measurement has an ambiguity of $L_A=(300/2)/1.1=136.36$ meters. Thus, the tag could be at a distance of 14.96 or 151.32 meters and produce the phases measured at 915 and 916.1 MHz. In this case, the consistent data are for a total distance of 15 meters +−0.04 meters. The distances of 165 and 151.32 meters are discarded since they are inconsistent, and the consistent calculation is the correct solution. Also in this case, accuracy has improved. If the tag has moved between the time of the measurements, tag movement is tracked by the reader and the combination of tag distance, time and velocity are used to eliminate inconsistent ambiguities.

In addition to resolving ambiguities in distance by limited reader range and the use of three properly selected RF frequencies, ambiguities in distance can be eliminated if measurements of phase are made with a continuously smooth function of frequency. This is accomplished with swept frequency reader described below herein.

Swept Frequency Method

The change in phase of the RF signal between the reader antenna and a tag is affected by the distance between the reader antenna and the tag and the frequency of the RF signal. Methods have been shown above to use measurements of the change of phase with frequency to measure the distance between the reader antenna and the tag antenna. The basic idea of using changes in the phase with frequency to measure distance can be extended to measure the distance between the reader antenna and a tag by measuring the change in frequency required to maintain a constant phase.

The RFID reader of FIG. 2 may be used to measure the distance between the reader antenna and tag using a swept frequency. The equations provided above may be modified to use this approach. however, an alternative is possible that offers other advantages.

The methods presented so far have depended on measurement of phase. Phase can be determined using the reader of FIG. 2 and direct measurements of phase if the phase quadrature relationship between the LO signals of the I and Q channels is maintained, if the mixers are identical with the same conversion loss, if the resulting signals remain in a linear relationship to each other until amplified to a level sufficient to be sampled, and if the analog to digital converter has high performance so that the inverse tangent calculation yields a reliable result for signals that vary over a 70 dB range in amplitude.

The process of measuring the phase of the RF signal returned by the tag is difficult to implement. While modern digital communications use I/Q demodulators, these systems operate on low level signals in the presence of amplifier noise and use techniques, such as training within packets, to synchronize and maintain phase quadrature conditions. Signals returned by a tag are sometimes greater than those received from a distant interfering transmitter, but the tag signals are buried in a very large interfering signal from the reader transmitter caused by reflections from objects in the field of the reader antenna. As a consequence, conventional digital I/Q demodulators cannot be used to demodulate the signals returned by a tag in a modulated backscatter RFID reader. Alternative techniques have been developed to receive and process these signals to reliably decode the data sent by the tag to the reader. The method of Koelle (U.S. Pat. No. 4,739,328) is one example. Another method uses only the strongest channel to decode the signal and uses the relative strengths of the I and Q channels only to control switching of the strongest IF channel to the decoding circuitry.

Cost and performance requirements are also demanding, as well as the range of frequencies over which an RFID reader must operate. Thus, maintaining a 'perfect' quadrature relationship for both the in phase and quadrature channels is difficult and potentially costly. Thus, it is attractive to develop a RFID reader to measure the reader antenna to tag distance using a multichannel homodyne receiver that may have significant variation from 90 degrees between the local oscillator signals for the I and Q channels. It is also desirable to use limiting amplifiers.

When a channel is in a quadrature null, the RF phase between the signals at the LO and RF ports of the mixer are in quadrature. The phase between the signals is 90+−n180 degrees where n is an integer. Measuring the frequencies that result in a quadrature null in a single channel can be used to measure reader antenna to tag distance as described below. A RFID reader is provided to accomplish this task.

Figure 8:
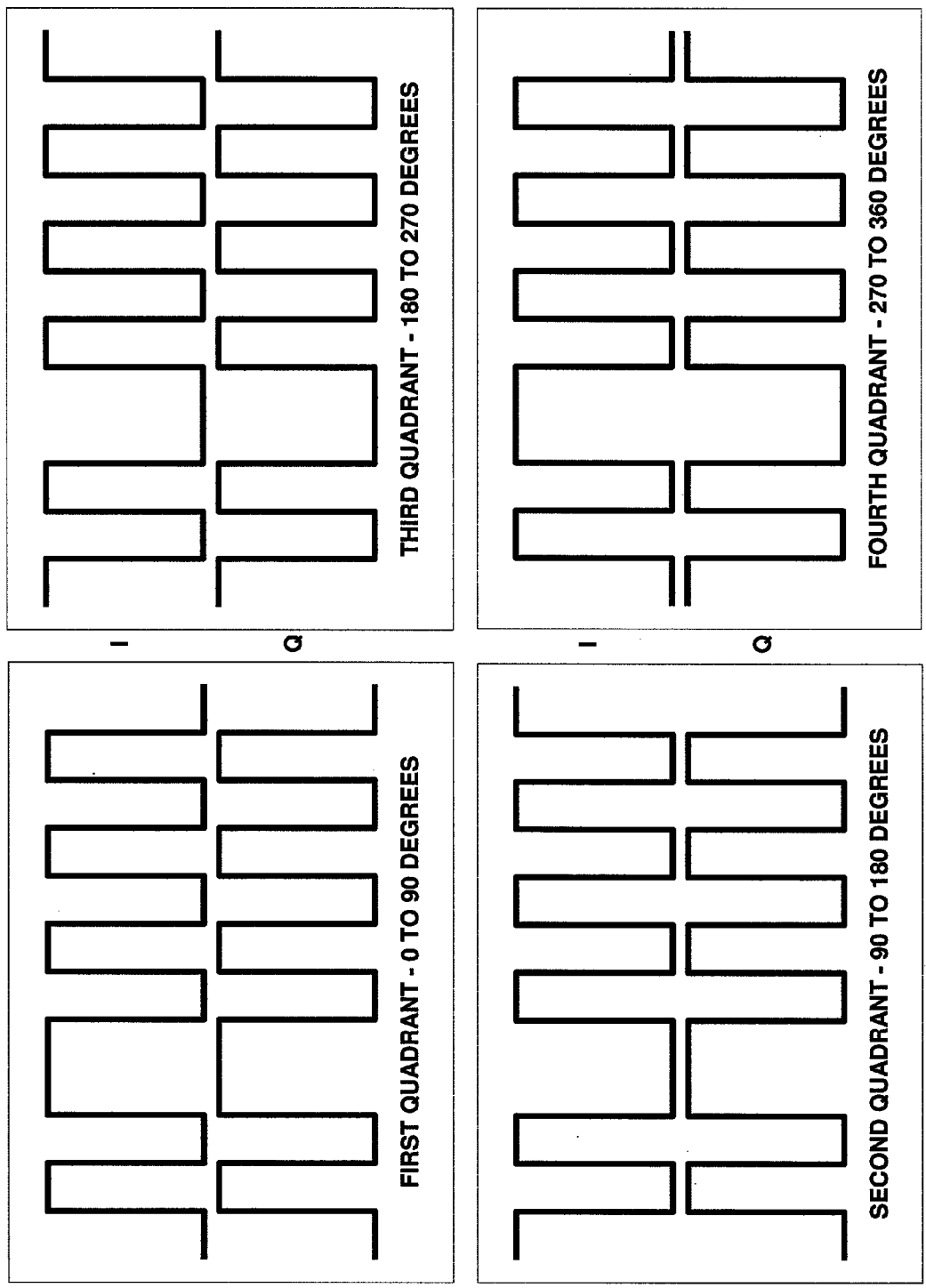
FIG. 8. is four diagrams showing the relationship between I and Q signals in the four quadrants.

As the frequency is changed, the phase between the LO and RF signals changes, and signals are of opposite polarity on either side of the quadrature null. That is, if the RF frequency increases from f1 to f2 to f3, and a quadrature null condition occurs at frequency f2, the IF signals at f3 are of opposite polarity as the IF signals at f1. Limited IF signals from the I and Q channels of a homodyne receiver are shown in FIG. 8 for various combinations of phase. The phase relationship changes with changes in RF frequency or changes in phase by design as in the system of FIG. 6. The phases can be divided into four quadrants: 1st from 0 to 90 degrees, 2nd from 90 to 180 degrees, 3rd from 180 to 270 degrees, and 4th from 270 to 360 degrees. The relationships between the in phase (I) and quadrature (Q) signals are shown in FIG. 8 for a 90 degree difference between the LO signals of the I and Q channels. As the phase increases from the 1st quadrant to the 2nd quadrant, the in phase signal reverses in sign. The resulting quadrature null is precisely at the frequency when the LO and RF signals of the in phase mixer are 90 degrees apart. Thus, a quadrature null occurs on one of the channels as the phase passes between each quadrant, or 4 per 360 degrees total.

A XNOR logic circuit can be used to generate an output signal that tracks whether the I and Q channels are of the same or opposite polarity. This signal will repeat for every 360 degrees in change in phase independent of requiring the LO signals of the I and Q channels to be precisely 90 degrees from each other. The output of the XNOR circuit will be a square wave with 50% duty cycle if the I and Q channels are exactly 90 degrees from each other.

Figure 9:
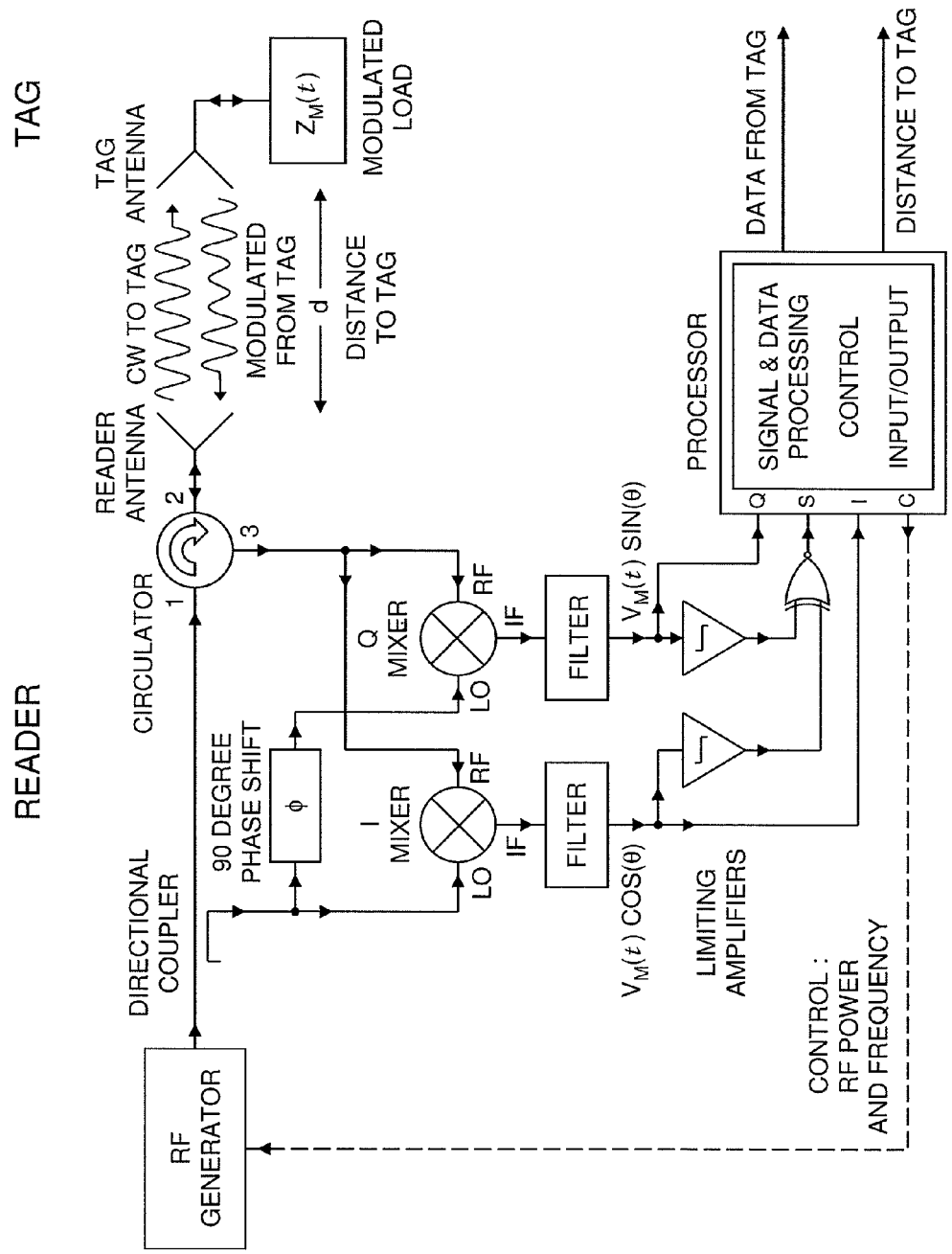
FIG. 9. is a schematic for a ranging backscatter RFID reader with quadrature homodyne receiver with XNOR sensing of quadrature null condition.

The reader of FIG. 9 includes two limiting amplifiers and a XNOR circuit to provide an output that indicates the relationship whether the I and Q channels are of the same or different polarity. This signal is labeled 'S' in the Processor box on FIG. 9. The reader also includes signal conditioning (not shown) on the output of the XNOR circuit to remove rapid spurious signal transients. The S signal may also be used to measure tag velocity when the reader transmits a constant frequency and phase to the tag.

The homodyne receivers operate in a conventional manner. The Processor section of the reader controls the RF Generator RF power and frequency. The frequency is swept across some band. Preferably, the frequency sweep is not discontinuous thus avoiding large transients in the IF signals and resultant loss of the ability of the Processor to decode tag data. The I and Q IF signals are processed to recover the information sent by the tag. In parallel the I and Q IF signals are amplified separately by limiting amplifiers. The outputs of the limiting amplifiers are conditioned to remove unwanted rapid transients (details not shown in FIG. 9). The outputs of the limiting amplifiers are input to an XNOR circuit producing an output signal labeled 'S' in FIG. 9. The Processor section processes the S signal to measure the transitions of the S signal. The RF frequencies corresponding in timing to transitions in the S signal are recorded. These frequencies (or alternatively only the timings) are used to calculate the reader antenna to tag distance as described below.

The RFID reader shown in FIG. 9. can determine the reader antenna to tag distance by sweeping the RF frequency and recording the RF frequency at the transitions of the S signal. Several methods may be used to convert the observed RF frequencies at the quadrature nulls to reader antenna to tag distance.

Figure 10:
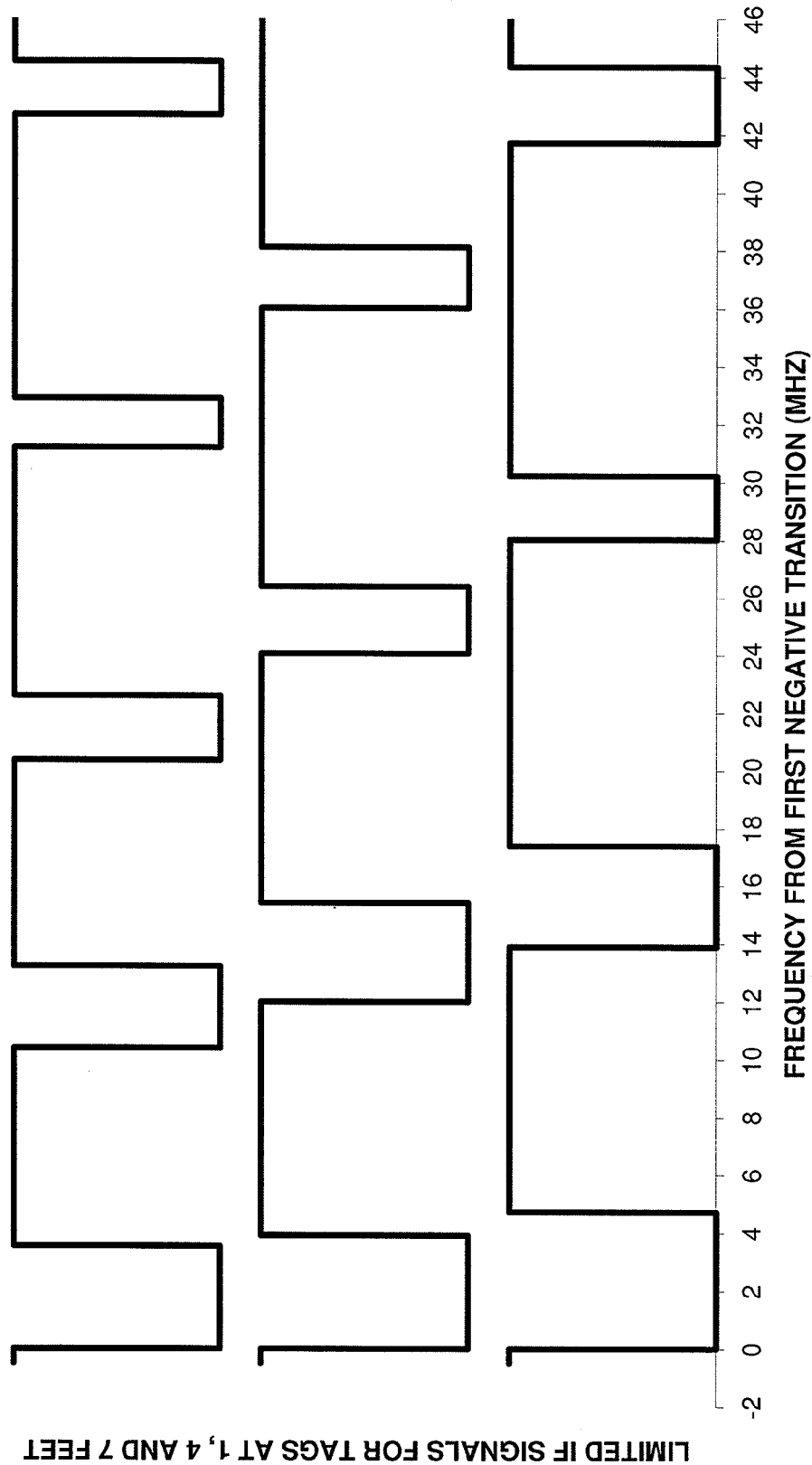
FIG. 10. is a graph showing detection of quadrature null conditions as the RF frequency is swept.

The S signal is shown in FIG. 10 for each of three reader antenna to tag distances as the frequency is swept. The S signals shown in FIG. 10 are for a reader where the I and Q channels vary from being exactly 90 degrees apart by a significant amount since the duty cycles are not 50%. The center frequency of the sweep is 920 MHz. As the frequency sweeps higher from the lowest value, the first negative transition was used as reference for all reader antenna to tag distances. Results are shown for three reader antenna to tag distances. Negative transitions are caused by a quadrature null on one channel, and positive transitions by the other channel. Thus, a phase change of 180 degrees occurs between transitions of the same sense.

The data of FIG. 10 was obtained for a reader antenna to tag distances of 7 feet, 4 feet and 1 foot (top to bottom in FIG. 10). The in phase and quadrature channels are not phased at 90 degrees apart, and the difference from 90 degrees increases as the frequency increases. This characteristic is due to the construction of the reader and is an unintended consequence of reader construction. It is desired to be able to measure reader antenna to tag distance with such a reader and not require 'perfect' reader phasing of the I and Q channels. As is shown below, a reader and method can be used to determine the reader antenna to tag distance using these signals that are far from the ideal.

Figure 11:
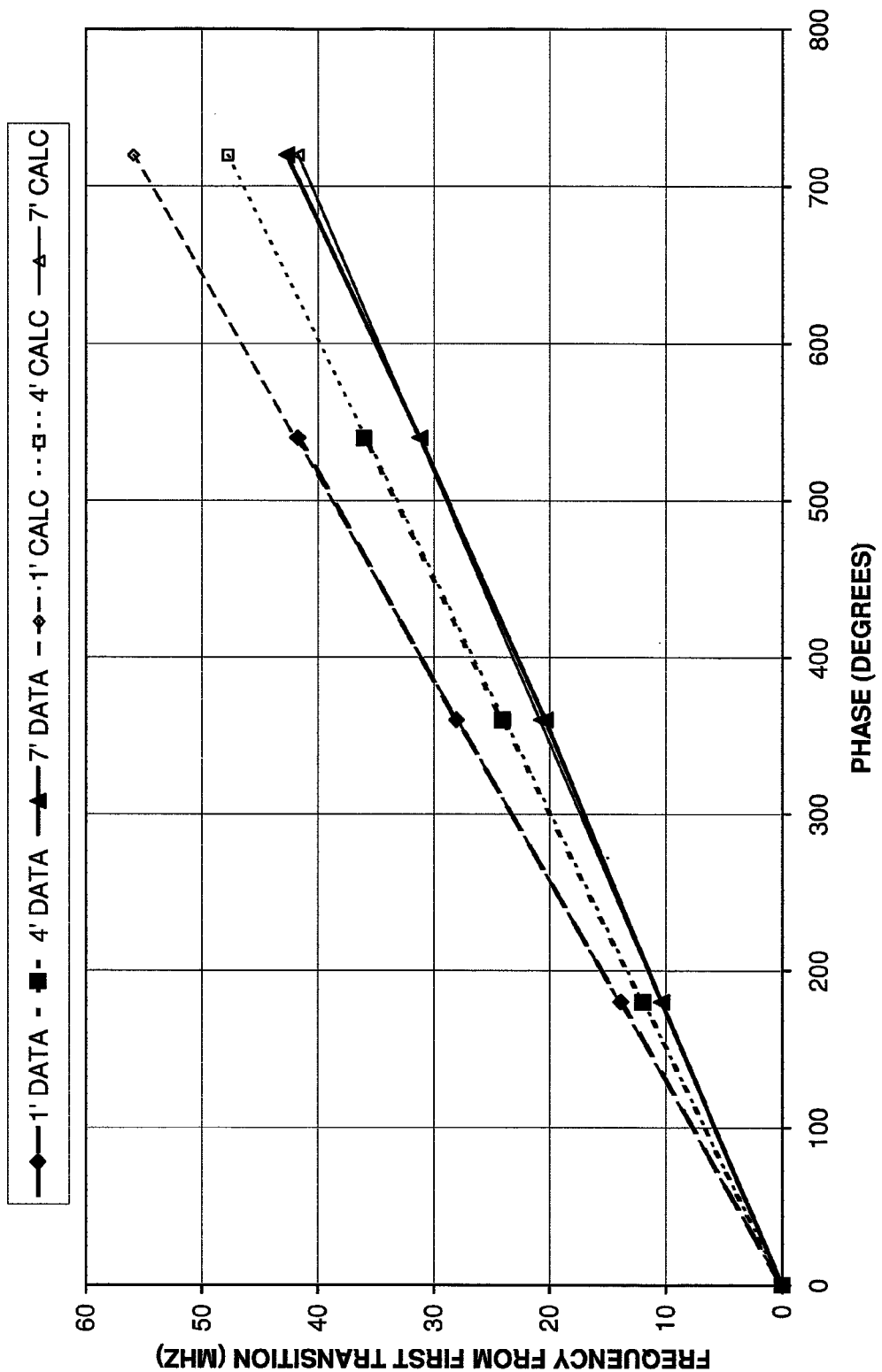
FIG. 11. is a graph showing frequency of quadrature null conditions for reader antenna to tag distances of 1 foot, 4 feet and 7 feet.

As the frequency is increased, the phase has increased by 180 degrees for each negative transition of the signals in FIG. 10. The data are plotted in FIG. 11, providing the change in frequency versus phase from the first negative transition. Data for a 1 foot distance has the greatest frequency for a given phase, since this is the shortest distance and higher frequency is required to reach the next quadrature null than for the 4 foot or 7 foot distances. The measured data are represented by the solid data point markers. The theoretical responses are shown in FIG. 11 by the straight line curves and the open data markers using the calibration data. The theoretical responses are developed below.

A sweep of 15 MHz is sufficient to obtain the frequency difference between quadrature nulls on a channel, and thus calculate distance.

The process begins, like the previous examples, with a calibration procedure. A preferred implementation is to use a frequency sweep that is repeatable and uniform in time. Then, the S signal can be processed by resetting a timer at a negative edge and measuring the time to the next negative edge. Then, the calibration data can be used to provide the reader antenna to tag distance. In this case, it is not necessary to measure the RF frequency. Alternatively, the RF frequencies can be recorded that coincide with the negative transitions of the signal S in FIG. 9, and the difference in frequency between transitions converted to the reader antenna to tag distance. A mathematical development follows.

Practical considerations favor small ranges for the frequency sweep. The large range shown in FIG. 11 is for illustrative purposes. These data show that accuracies on the order of several centimeters can be obtained with these techniques using actual hardware without requiring careful control of channel phasing and not requiring linear amplifiers.

A mathematical analysis and development of the approach follows for the technique and equipment discussed above.

Consider an RF interrogating signal at frequency $f_1$. If the local oscillator signal and the signal returned by the tag are in phase quadrature, the one-way electrical length difference between the LO port and the path to the tag must be a must be one eight of a wavelength with an uncertainty of a number of quarter wavelengths. Thus, the round trip electrical length will be in phase quadrature. The condition for the one-way electrical path length, $L_T$, to be in phase quadrature referred to the phase of the LO signal is:

$$L_T = \lambda_1/8 + n\lambda_1/4 \qquad \text{eq (51)}$$

The round trip path is two times $L_T$ and thus is a quarter wavelength (90 degrees) plus an unknown number of half wavelengths.

If the frequency is increased from RF frequency $f_1$ to $f_2$, the one way electrical length will have increased by a quarter wavelength in a channel at the next quadrature null and for the frequency $f_2$. If the tag has not moved, the actual electrical length measured in meters will have not changed. Thus $$L_T = \lambda_2/8 + (n+1)\lambda_2/4 \qquad \text{eq (52)}$$

Using the relation that $\lambda=c/f$ (where c is the velocity of light) and solving for f, $$f_1=c(2n+1)/(8L_T) \quad \text{eq (53)}$$

$$f_2=c(2n+3)/(8L_T) \quad \text{eq (54)}$$

Subtracting $f_1$ from $f_2$, $$\Delta f=f_2-f_1=c/4L_T \quad \text{eq (55)}$$

$$\text{or } L_T=c/4\Delta f \quad \text{eq (56)}$$

The electrical length $L_T$ consists two parts: first, the part that is the reader antenna to tag distance, $L_{RT}$, and secondly, a part that does not depend on the reader antenna to tag distance, $L_F$:

$$L_T=L_F+L_{RT} \quad \text{eq (57)}$$

The calibration procedure consists of placing the tag at a known distance, $L_{RT}$, and measuring $\Delta f$. Then the fixed part of the electrical length may be found from $$L_F=c/4\Delta f-L_{RT} \quad \text{eq (58)}$$

Thus, the system is calibrated and for any reader antenna to tag distance, that distance may be found by measuring $\Delta f$ and using the equation:

$$L_{RT}=c/4\Delta f-L_F \quad \text{eq (59)}$$

This procedure was followed using the data shown in FIG. 10 to produce the calculated data of FIG. 11. The reader of FIG. 9 is suitable for this method with a Processor section that has proper controls of frequency and proper processing of the data.

The data shown in FIG. 10 was obtained by placing the tag at a known, desired distance from the front surface of the radome of the reader antenna. Distances of 1 foot, 4 feet and 7 feet were chosen. In practice, only one distance is required for calibration. Three tag positions are used in this analysis to improve the accuracy of the calibration, and to confirm that the approach is valid and produces usable results for homodyne receivers and readers using limiting amplifiers of normal construction. The method developed here can be also used for readers that do not use limiting amplifiers. The following steps, controls, data processing and calculations are done by the reader of FIG. 9.

The frequency was swept through a range of frequencies with a center frequency of 920 MHz of the sweep range, and using a normal production tag. The frequencies are recorded for the negative transitions of the 'S' signal of FIG. 9 (the conditioned output of the XNOR circuit). Frequency differences were calculated, using the lowest frequency of a transition as a reference. For this example, the tag was repositioned, and the measurements repeated for two additional distances. The measured data are provided in Table 1 which shows the difference in frequency from the frequency of the first negative transition of the output of the XNOR circuit to frequencies of subsequent negative transitions for several reader antenna to tag distances.

The difference in frequency between each 180 degrees of phase (between negative transitions of the 'S' signal) is provided in Table 2. The calculated values of the total length using equation 56 and the reader antenna to tag length, $L_{RT}$, to find the fixed length, $L_F$, are shown in Table 3. The straight line curves on FIG. 11 were calculated using the fixed length found from calibration, the reader antenna to tag distance and equation 57 to calculate the total length. Then the value of $\Delta f$ was then found for each 180 degrees of phase using equation 56 (or $\Delta f=c/4$ L) and the results plotted in FIG. 11. The measured data is also plotted in FIG. 11 showing good agreement.

TABLE 2

| Reader antenna to tag distance (feet) | Difference in MHz between the frequencies of 1st and 2nd negative transitions of the 'S' signal | Difference in MHz between the frequencies of 1st and 3rd negative transitions of the 'S' signal | Difference in MHz between the frequencies of 1st and 4th negative transitions of the 'S' signal | Difference in MHz between the frequencies of 1st and 5th negative transitions of the 'S' signal |
|---|---|---|---|---|
| 1 | 13.90 | 28.03 | 41.73 | |
| 4 | 12.00 | 24.03 | 36.03 | |
| 7 | 10.40 | 20.75 | 31.20 | 41.60 |
| 1 | 13.90 | 28.03 | 41.73 | |
| 4 | 12.00 | 24.03 | 36.03 | |
| 7 | 10.40 | 20.75 | 31.20 | 41.60 |

TABLE 3

| Reader antenna to tag distance (feet) | Average of the frequency differences between negative transitions of the 'S' signal | Total length in meters calculated using the average frequency differences and equation 56 | Total length in feet calculated using the average frequency differences and equation 56 | Reference length, $L_F$, in feet using equation 58 |
|---|---|---|---|---|
| 1 | 13.91 | 5.392 | 17.69 | 16.69 |
| 4 | 12.01 | 6.246 | 20.49 | 16.49 |
| 7 | 10.40 | 7.212 | 23.65 | 16.65 |
| Average = $L_F$ | | | | 16.61 |

Figure 12:
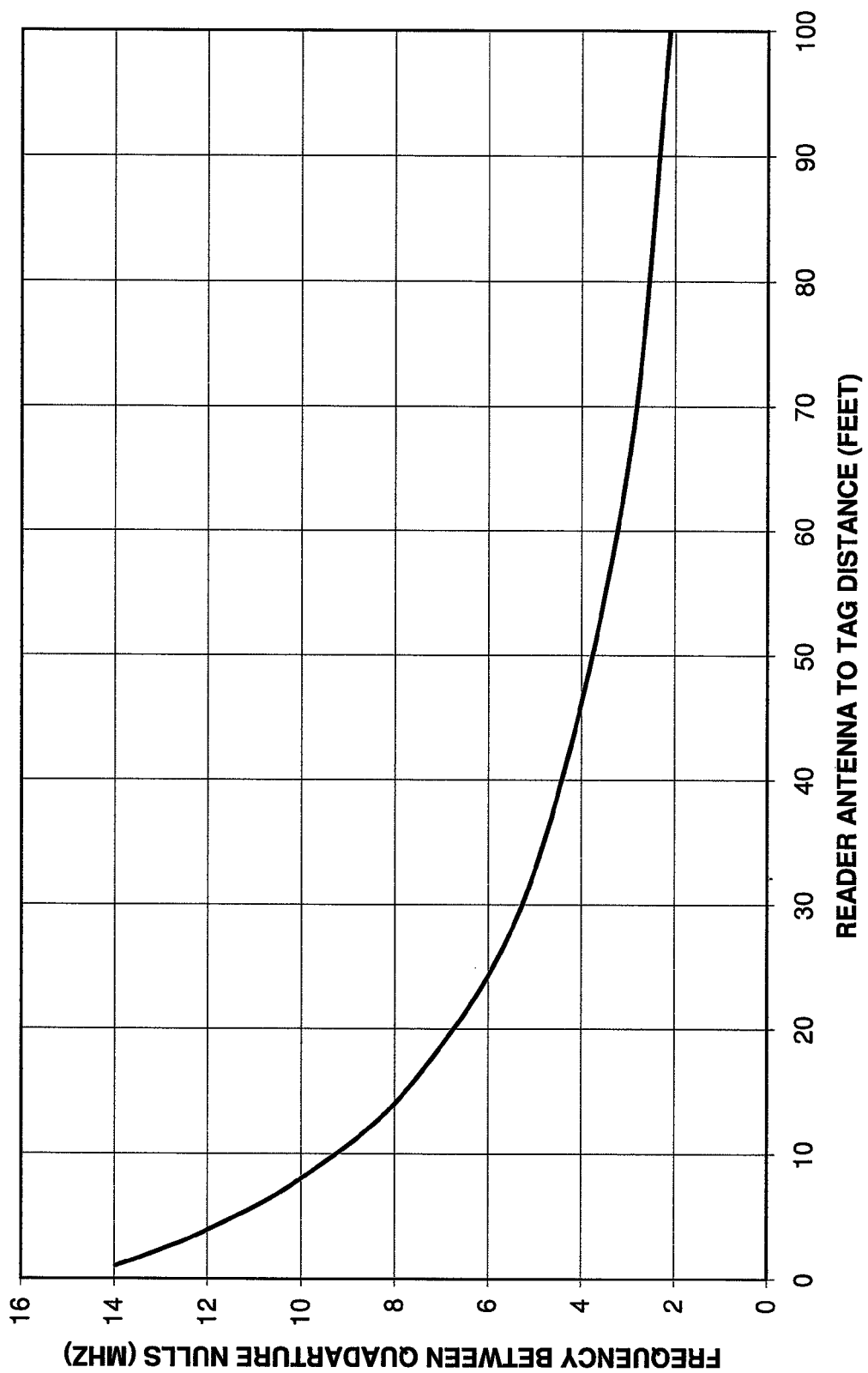
FIG. 12. is a graph showing frequency difference between quadrature nulls as a function of reader antenna to tag distance.

With calibration completed, the reader can now be used to measure the distance to a tag at an unknown distance from the reader antenna by sweeping frequency, measuring the frequencies of the resulting quadrature nulls, and calculating distance using equation 59. The reader may alternatively use a lookup table based on the calibration data and equation 59. A curve is plotted in FIG. 12 that shows the relationship between reader antenna to tag distance and difference frequency between quadrature nulls.

Ambiguities in distance are eliminated using the swept frequency method. However, at small tag distances, a large

TABLE 1

| Reader antenna to tag distance (feet) | Difference in MHz between the frequencies of 1st and 2nd negative transitions of the 'S' signal | Difference in MHz between the frequencies of 1st and 3rd negative transitions of the 'S' signal | Difference in MHz between the frequencies of 1st and 4th negative transitions of the 'S' signal | Difference in MHz between the frequencies of 1st and 5th negative transitions of the 'S' signal |
|---|---|---|---|---|
| 1 | 13.90 | 28.03 | 41.73 | |
| 4 | 12.00 | 24.03 | 36.03 | |
| 7 | 10.40 | 20.75 | 31.20 | 41.60 | bandwidth is required to make the necessary measurements. An alternative is to make measurements of phase with samples taken at nominal intervals of frequency, and the frequency swept only far enough to determine whether the quadrature nulls indicate that the tag is near or distant. The required frequency sweep range may be calculated using the principles discussed above.

The swept frequency system is one example of the present invention using modulated signals transmitted by the reader. Other modulations are also within the scope of the present invention such as radio frequency that has step changes, sinusoidal frequency modulation with time, two simultaneously swept frequencies that are offset and track, etc. The phase of the backscattered signal may also be measured in the presence of an amplitude modulated signal sent by the reader, and thus the present invention is applicable to a full duplex transmission system. While the present invention has been illustrated using tags that send data to a reader, no data need be sent by the tag to the reader to enable the reader to measure the distance to a tag, only a modulation of the radio signal scattered by the tag is needed. For each of these alternatives, construction of the reader and processing the data to find the distance can be accomplished using the methods and techniques presented herein.

Measurement of Phase

Distance to a tag can be calculated from the derivative of phase with frequency of the modulated backscatter RF signal from a tag. Distance to a tag can also be calculated using measurements of the phase of the modulated backscatter signal from a tag as the frequency is swept. The derivative of phase with frequency may be calculated from sampled values of the phase at selected frequencies using a method of inserted phase to reach a quadrature null, by using the magnitudes of the in phase and quadrature detected signals, and by other methods. The phase relationships of the signals repeats for multiples of the wavelength of the RF carrier signal, or portions of the wavelength. The method used to measure and process phase information affects the length of ambiguities. If the phase can be resolved within +−180 degrees, the ambiguity in one-way path length is half the wavelength of a signal with the smallest frequency difference between samples of data. If the phase can be resolved to +−90 degrees, the ambiguity in one-way path length is a quarter of a signal with the smallest frequency difference between samples of data.

Thus, the possible ambiguity in distance depends on the reader implementation details of the measurement and processing of the in phase and quadrature signals. To illustrate, the processing of the in phase and quadrature signals by the reader of FIG. 2 is explained here. Representative in phase and quadrature signals are shown in FIG. 8 for various ranges of value of phase. The phase is resolved within the range of +−90 degrees by the following process: 1. For each channel, in phase and quadrature, separately, the IF signal is split into two parts, A and B. 2. The B signal is inverted. 3. Both the A and B signals are AC coupled, so that the mid-point of the signals is at a voltage of 0. 4. Both the AC coupled A and B signals are rectified, producing signals that vary from 0 volts to the peak voltage of the modulated signal. 5. AC coupled and rectified A and B signals are added together and filtered to remove glitches (rapid signal transitions due to timing flicker, etc.) producing a third signal C which is unmodulated (a steady DC value) with a value of the peak voltage of the modulated signal. 6. The amplitude of the resulting DC level of the third signal C is measured. One implementation is to input signal C into an analog-to-digital converter, and output the amplitude of the digitized value of the DC voltage to a digital processing unit in the reader. 7. The phase is calculated using the inverse tangent function of the C signals of the I and Q channels, resulting in an angle between 0 and 90 degrees since both of the C signals are positive.

The process then continues by determining if the signals of the in phase and quadrature channels are of the same polarity (thus the phase angle is from 0 to 90 degrees, or in the first quadrant) or opposite (thus the phase angle is from 0 to −90 degrees, or in the fourth quadrant). The digital processing unit calculates the magnitude of the phase angle using the inverse tangent function applied to the relative magnitudes of the in phase and quadrature signals found for each channel in step (6) above. Thus, the phase angle of the RF carrier signal has been determined within the range of +−90 degrees.

Determining the phase angle within the range of +−180 degrees requires establishing and tracking what a 'positive' signal is at any given time. The process for accomplishing this task may depend on the code in use to transfer the data from the tag to the reader. For example, a frame marker, beginning of frame (BOF) or other unique feature is used to synchronize the decoding of data. The reader finds the BOF in the string of modulation and establishes whether the sampled signal is 'right side up' or 'upside down'. If the in phase signal is 'right side up', then the phase is within the range of −90 degrees to +90 degrees (in the first or fourth quadrants). If the in phase signal is 'upside down', then the phase is within the range of +90 degrees to +270 degrees (in the second or third quadrants). With this information, the reader can then determine the phase angle using the added information to that produced by application of steps 1-6 above and resolve the phase angle with in the range +−180 degrees.

Signal polarity may also be determined by the reader by decoding the received signal and also the inverse of the received signal. The signal that is decoded without check sum or parity errors is the 'right side up' or positive signal. Calculation of the quadrant and value of phase angle then proceeds as above.

Alternative RFID Reader Architecture

The techniques of the RFID reader of FIG. 9 can be used to find the phase of quadrature nulls for the methods presented here earlier for the RFID readers of FIGS. 2 and 6 and for each channel of the RFID reader of FIG. 3. A resulting RFID reader for each channel is shown in FIG. 13.

In some installations of the RFID system, it may be against regulations or otherwise unattractive to sweep the RF frequency by 10 MHz or more. In these cases, it is preferable to use two (or more is optional) non-swept frequencies and measure the phase of quadrature nulls by sweeping the phase between the LO and RF signals. The reader of FIG. 13 uses the XNOR method, and thus is insensitive to unbalances between the I and Q channels in magnitude and phase.

Figure 13:
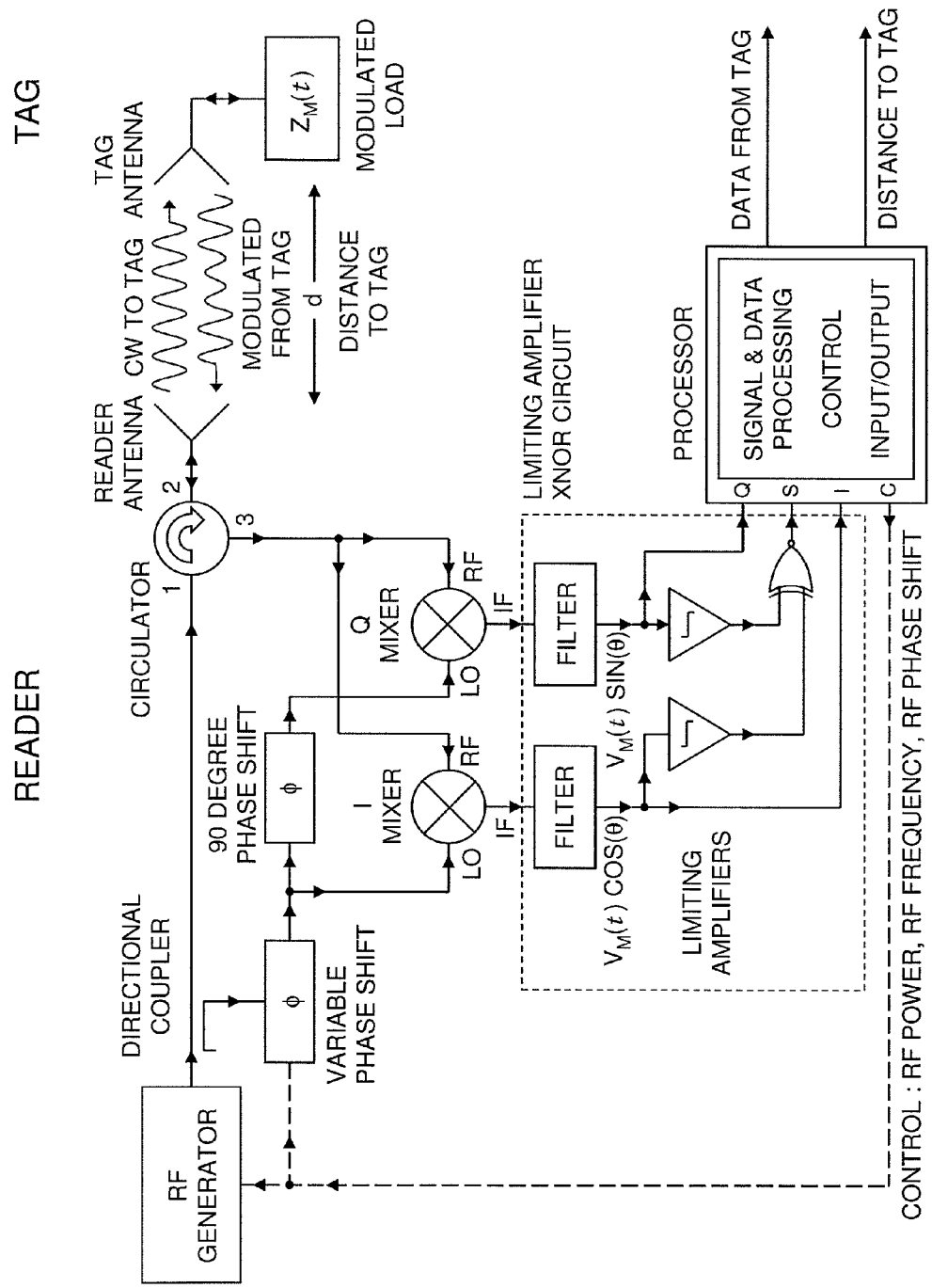
FIG. 13. is a schematic of a ranging backscatter RFID reader with quadrature homodyne receiver with XNOR sensing of quadrature null condition and variable phase.

Also shown in FIG. 13 is an alternative location for the controlled variable phase shifter. It is placed in the LO signal line, and thus is required to handle a much lower RF power. This is attractive from practical considerations. The phase is varied electronically and the phase angle is recorded when the output of the XNOR circuit (the signal 'S') indicates a quadrature null condition (any of the transitions of the signal of FIG. 10.)

A dual receiver reader may be used combining the elements of the reader of FIG. 13 with the architecture of the reader of FIG. 3. With this combination, accurate determination of tag distance may be implemented for tags traveling at high velocity and using limiting amplifiers.

For any of the readers described for this invention using controlled changes in phase and/or frequency, it is preferable to avoid abrupt changes in phase and/or frequency since these introduce large transients in the IF signals processed by the homodyne receivers. Large abrupt changes in signals are problematic. Thus, it is preferable to use sweeping methods which are sinusoidal, continuously linear, and the like. Thus, for example, if the phase is to be varied over 360 degrees, it is preferable to ramp the signal from 0 degrees up to 360 degrees, and then ramp the signal back down to 0 degrees, and repeating as required.

The elements of the RFID reader shown in FIG. 13 operate as described for other RFID reader architectures described earlier here. Other extensions or modifications are possible using the methods and techniques described herein.

Two Frequency RFID Reader for Distance Measurement of Moving Tags

Figure 14:
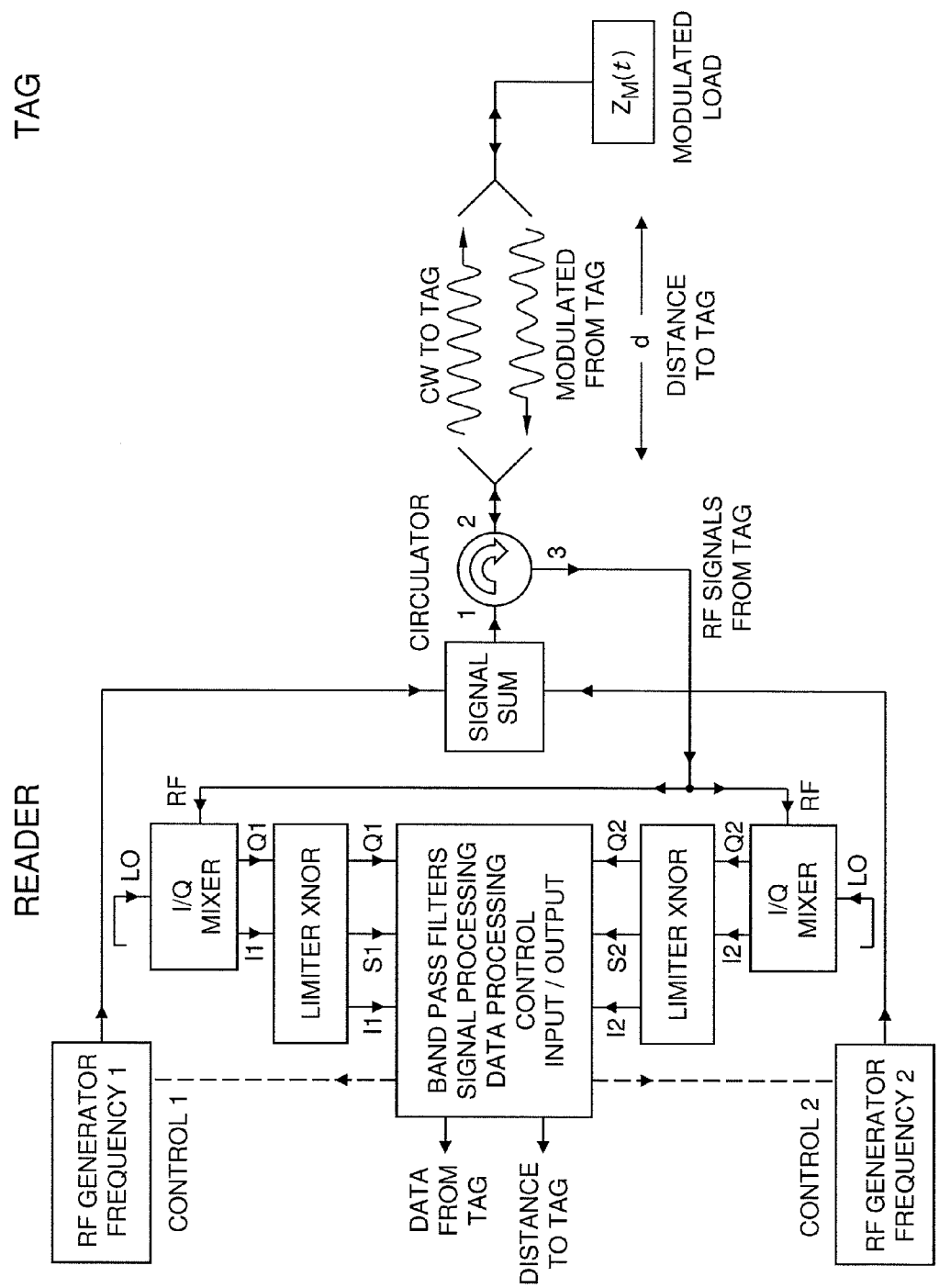
FIG. 14. is a schematic of a two-frequency RFID reader for distance measurement of tags at high speed.

A two frequency RFID reader for distance measurement of tags moving at high speed is shown in FIG. 14.

As a tag moves in the field of the reader, the tag passes through locations of quadrature null conditions for the in phase (I) and quadrature (Q) channels. Some of the previously presented readers of the present invention may produce poor results if a tag is moving at high velocity. For example, consider a swept frequency method that is used in conjunction with the reader of FIG. 9 to calculate the distance to a tag based on the details of the 'S' signal produced by the 'Limiting Amplifier XNOR Circuit'. The signals produced as the frequency is swept will change in phase as a tag moves as well as due to the frequency sweep. Thus, the calculated distance will be in error if the tag has significant movement with respect to the RF wavelength as the measurements are made. The RFID reader of FIG. 14 overcomes the problems caused by tag motion and produces reliable and undistorted measurements of distance with limited bandwidth and when a tag is moving. The circuits labeled 'Limiter XNOR' in FIG. 14 are shown by the dotted line box labeled 'Limiting Amplifier XNOR Circuit' in FIG. 13.

The reader of FIG. 14 employs two RF channels, each using a RF frequency different from the other channel, transmitted simultaneously and processed to produce an 'S' signal for each frequency indicating the condition of quadrature nulls for each of the two RF frequencies. As a tag moves, the locations of quadrature null conditions depend on the RF frequency and the distance from the reader antenna to the tag. The distance is calculated from measurements of the 'S' signals at the two RF frequencies.

Each of the channels of the reader shown in FIG. 14 operate in the same fashion as the reader shown in FIG. 13. However, the new reader of FIG. 14 uses new methods to process the 'S' signals to calculate the distance to a tag.

Figure 15:
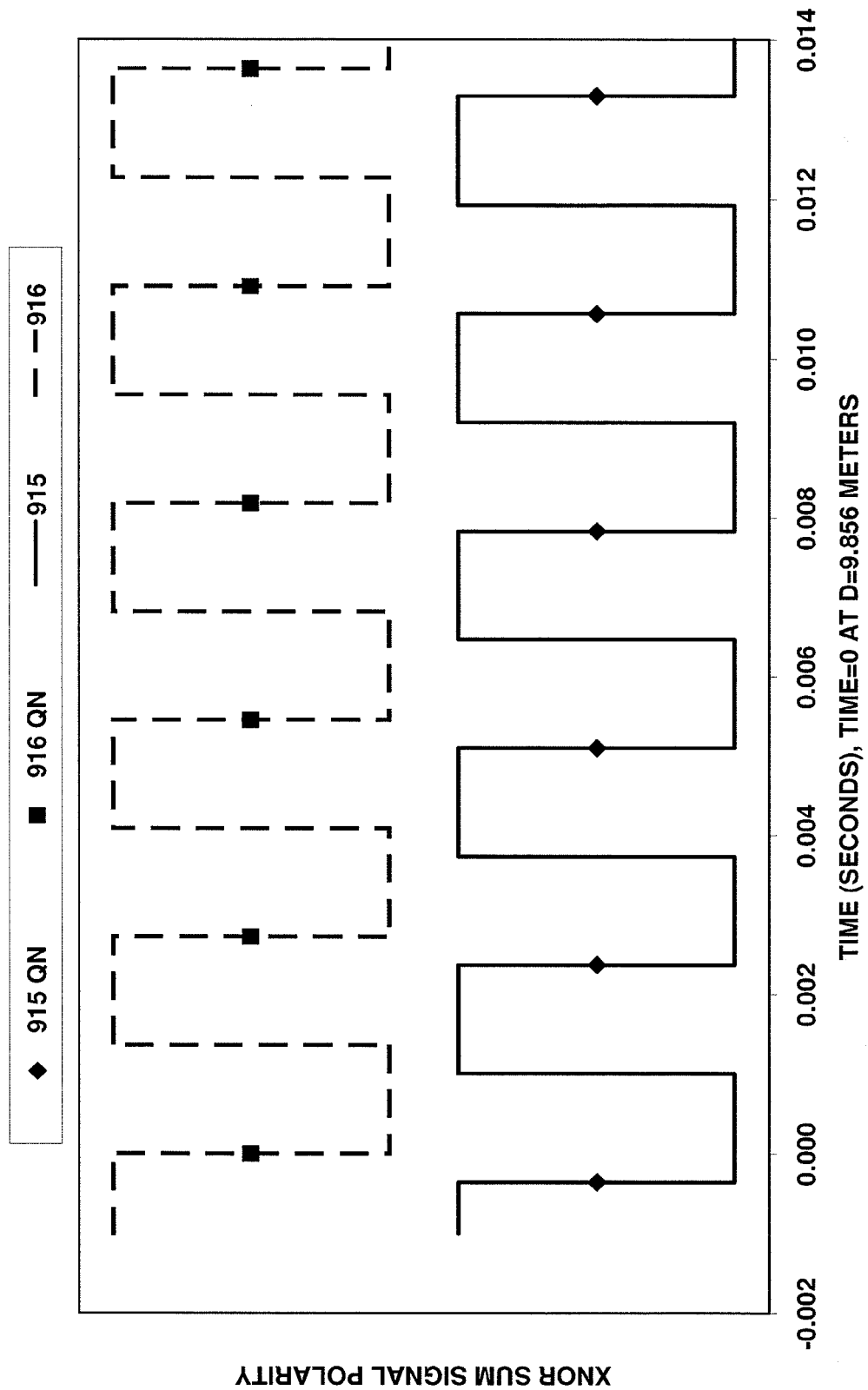
FIG. 15. is a diagram showing signals produced by the XNOR circuit for both channels of FIG. 14.

The operation of the new reader is illustrated here by example. A tag moving 30 m/s toward a reader produces 'S' signals as shown in FIG. 15 for a reader transmitting 915 and 916 MHz. The distance to the tag at the transitions of the 'S' signal, the quadrature null conditions, of the 916 MHz channel are to be measured and plotted as a function of time. The time is arbitrarily chosen to be zero for the time of the first negative transition of the 'S' signal in the 916 MHz channel of FIG. 15. The time of the negative transitions in the 915 MHz channel prior to and after that for the 916 MHz channel occur at −0.000359 and 0.002371 seconds, respectively. The transition at 916 MHz occurs at the fraction of 0.000359/(0.002371+0.00359)=0.1315 of the cycle between quadrature nulls occurring at negative transitions of the 'S' signal on the 915 MHz channel. These negative transitions occur for every 180 degrees of round trip path, or 90 degrees for the one way distance between the reader antenna and the tag without degradation even when the I and Q channels are not perfectly phased apart by 90 degrees. The pattern repeats for every 90 degrees of the wavelength of the difference frequency. The difference frequency is 1 MHz with a wavelength of 300 meters (approximately) in this example. Thus, the distance to the tag is 0.1315*300/4=9.86 meters.

Figure 16:
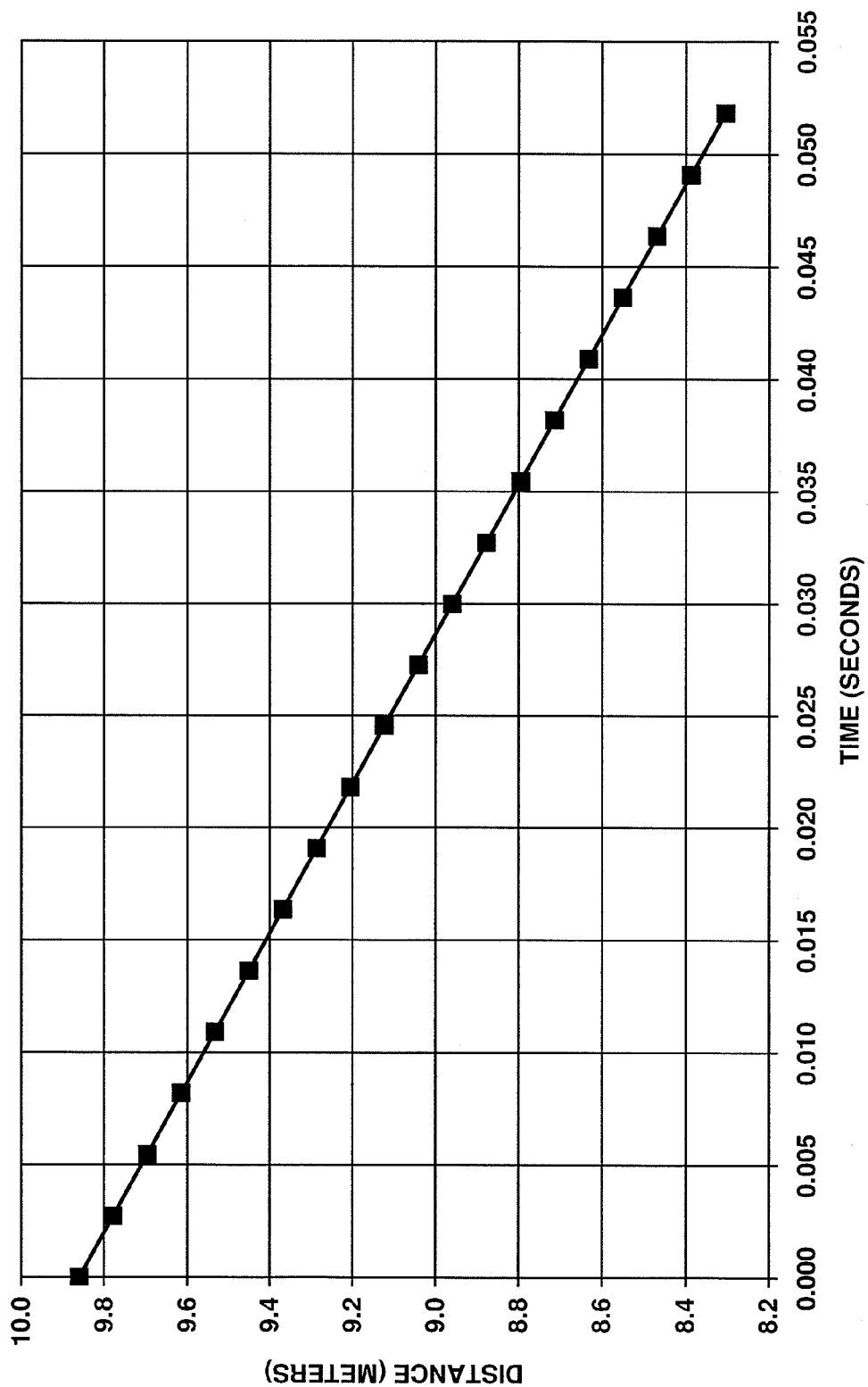
FIG. 16. is a graph showing the distance between the reader antenna and a tag moving toward the reader at a speed of 30 m/s.

The distance is plotted as a function of time in FIG. 16.

To confirm the speed of the tag, the tag moves from a distance of 9.86 meters to 8.30 meters in 0.051280 seconds for a speed of 30 meters per second. The reader measures the distance to a tag at times determined by tag motion, and not at times chosen by the reader. If the tag is stationary, and the distance to the tag is desired, the reader operates in one of the earlier, alternative modes by changing frequency, frequency sweeping or inserting phase (phase shifters not shown in FIG. 14) to measure the distance. The tag may also accelerate or decelerate without materially affecting the accuracy. Accelerations of more than many times the acceleration of gravity result in small changes in velocity during the time between times that the tag passes locations producing quadrature nulls, so the fraction calculation suffers little loss of accuracy.

The distance measured in this example is the total electrical distance to the tag. A calibration process determines the part of the total distance that is independent of tag motion. This fixed distance is subtracted from the total distance providing a mapping of tag distance as a function of time referenced to the reading zone of the reader.

Several methods of measuring the distance to a tag by a reader using changes in phase as a function of frequency and distance have been presented herein. A reader may be contained in a single enclosure or distributed between several subsystems. The illustrated embodiments are not all inclusive. Other methods and systems may be developed that are within the scope of the present invention. The invention encompasses any communication system that finds the distance between radio units through measurements of phase of modulated backscatter signals from one unit to another. Thus, the term 'reader' may also be called a master unit, base station, transmitter, interrogator, transponder, etc., and a 'tag' may also be called a slave unit, satellite station, transponder, responder, probe, etc. The invention was illustrated herein within the context of a RFID system, but the invention applies equally to other modulated backscatter radio systems. The backscattered signals may contain information, or need not contain information and consist of non-information bearing modulation (such as a tone, series of tones, etc.).

What is claimed is:

1. A system for measuring the distance between a first and second radio, the system comprising:
    a first radio comprising:
        a first radio transmitter and
        a phase sensitive receiver; and
    a second radio
    wherein said first radio transmitter transmits first and second signals at first and second frequencies and comprises a variable phase shifter for shifting the phase of said first and second transmitted signals relative to a reference signal used by said phase sensitive receiver;
    said second radio modulates said first and second signals to create modulated backscattered first and second signals having first and second phase relationships to said first and second signals;

said phase sensitive receiver produces first and second outputs representative of said first and second phase relationships;

said phase sensitive receiver comprises limiting amplifiers on said first and second outputs of said phase sensitive receiver; and wherein the distance between the first and second radio is calculated as a function of said first and second outputs.

2. The system of claim 1, wherein said phase sensitive receiver comprises an
in phase mixer (I) and a quadrature mixer (Q) to produce said outputs representative of said first and second phase relationships.

3. The system of claim 2, wherein the distance between the first and second radio is calculated as a function of said first and second outputs and signal strength.

4. The system of claim 2, further comprising a logic circuit to combine said I and Q outputs to determine a polarity relationship between said I and Q outputs.

5. The system of claim 4, wherein said modulation by said second radio includes a synchronization marker to resolve phase angle ambiguity.

6. The system of claim 1, wherein said first and second signals are transmitted at different times.

7. The system of claim 1, wherein the distance between the radios is calculated as a function of the difference between said first and second outputs.

8. The system of claim 1, wherein said variable phase shifter is adjusted to produce a quadrature null.

9. The system of claim 1, wherein the distance between the radios is calculated as a function of the rate of change of the difference between said first and second outputs with respect to frequency.

10. The system of claim 1, wherein said first radio transmitter transmits signals at more than two frequencies and produces outputs representative of phase relationships for each of said frequencies and wherein the distance between the radios is calculated as a function of the rate of change of the difference between said outputs with respect to frequency.

11. The system of claim 10, wherein said frequencies are swept.

12. A system for measuring the distance between a first and second radio, the system comprising:
a first radio comprising:
first and second radio transmitters and
first and second phase sensitive receivers; and
a second radio
wherein said first transmitter transmits said first radio signal at a first frequency;
said second transmitter transmits said second radio signal at a second frequency,
said second radio modulates said first and second signals to create modulated backscattered first and second signals having first and second phase relationships to said first and second signal,
said first phase sensitive receiver produces a first output representative of the phase relationship between said first radio signal and said first backscattered signal,
said second phase sensitive receiver produces a second output representative of the phase
relationship between said second radio signal and said second backscattered signal;
wherein the distance between the first and second radio is calculated as a function of said first and second outputs; and
wherein said first and second radio transmitters each comprises a variable phase shifter for shifting the phase of said first and second transmitted signals relative to a reference signal used by said first and second phase sensitive receivers, respectively.

13. The system of claim 12, wherein each of said phase sensitive receivers comprises an in phase mixer (I) and a quadrature mixer (Q) to produce said outputs representative of said first and second phase relationships.

14. The system of claim 12, wherein said first and second signals are transmitted simultaneously and said second radio modulates and backscatters both signals simultaneously.

15. The system of claim 12, wherein each of said variable phase shifters is adjusted to produce a quadrature null.

16. The system of claim 12, wherein the distance between the radios is calculated as a function of the rate of change of the difference between said first and second outputs with respect to frequency.

17. The system of claim 12 wherein said first radio transmitter transmits signals at more than two frequencies and produces outputs representative of phase relationships for each of said frequencies and wherein the distance between the radios is calculated as a function of the rate of change of the difference between said outputs with respect to frequency.

18. The system of claim 17, wherein said frequencies are swept.

19. A system for measuring the distance between a first and second radio, the system comprising:
a first radio comprising:
an RF signal generator;
a radio receiver comprising an in phase (I) and quadrature (Q) mixer with limiting amplifiers on the outputs of said mixers;
a variable phase shifter for shifting the output of said RF signal generator relative to a reference signal used by said I/Q mixer; and
a second radio;
wherein said RF signal generator transmits first and second signals at first and second frequencies;
said second radio modulates said first and second signals to create modulated backscattered first and second signals having first and second phase relationships to said first and second signals;
wherein said variable phase shifter is adjusted to produce a quadrature null at said I/Q mixer for each of said first and second signals;
wherein the amount of adjustment of said phase shifter necessary to achieve said quadrature null is representative of said first and second phase relationships; and
wherein the distance between the first and second radio is calculated as a function of said first and second phase relationships.

20. A system for measuring the distance between a first and second radio, the system comprising:
a first radio comprising:
an RF signal generator;
a radio receiver comprising an in phase (I) and quadrature (Q) mixers having I and Q outputs;
and an XNOR logic element to combine said I and Q outputs to produce an S signal representative of the polarity of said I and Q outputs; and
a second radio;
wherein said RF signal generator transmits a swept frequency signal;
said second radio modulates said swept frequency signal to create a modulated backscattered swept frequency signal; and
wherein RF frequencies corresponding to transitions of said S signal are recorded and used to calculate the distance between the first and second radios.

21. A system for measuring the distance between a first and second radio, the system comprising:
a first radio comprising:
an RF signal generator;

a radio receiver comprising an in phase (I) and quadrature (Q) mixers having I and Q outputs;
a variable phase shifter for varying the phase of the reference signal for the in phase (I) and quadrature (Q) mixers;
and an XNOR logic element to combine said I and Q outputs to produce an S signal representative of the polarity of said I and Q outputs; and
a second radio;
wherein said RF signal generator transmits first and second signals at first and second frequencies;
said second radio modulates said first and second signals to create modulated backscattered first and second signals having first and second phase relationships to said first and second signals; and
wherein RF frequencies corresponding to transitions of said S signal at said first and second frequencies are recorded and used to calculate the distance between the first and second radios.

22. A system for measuring the distance between a first and second radio, the system comprising:
a first radio comprising:
first and second RF signal generators;
a radio receiver comprising first and second in phase (I) and quadrature (Q) mixers having I and Q outputs;
a first and second XNOR logic elements to combine said first and second I and Q outputs to produce first and second S signals representative of the polarities of said first and second I and Q outputs; and
a second radio in motion with respect to the first radio;
wherein said first and second RF signal generators transmit simultaneous first and second signals at first and second frequencies;
said second radio modulates said first and second signals to create backscattered first and second signals having first and second phase relationships to said first and second signals;
said first I/Q mixer and XNOR logic circuit produce first outputs representative of said first phase relationships;
said second I/Q mixer and XNOR logic circuit produce second outputs representative of said second phase relationship; and
wherein the distance between the first and second radio is calculated as a function of said first and second outputs.

* * * * *